(12) United States Patent
Zhu et al.

(10) Patent No.: US 9,295,074 B2
(45) Date of Patent: Mar. 22, 2016

(54) ACKNOWLEDGEMENT, ERROR RECOVERY AND BACKOFF OPERATION OF UPLINK MULTI-USER MULTIPLE-INPUT-MULTIPLE-OUTPUT COMMUNICATION IN WIRELESS NETWORKS

(71) Applicant: SAMSUNG ELECTRONICS CO., LTD., Suwon, Gyeonggi-Do (KR)

(72) Inventors: Chunhui Zhu, San Jose, CA (US); Youngsoo Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 96 days.

(21) Appl. No.: 14/023,204

(22) Filed: Sep. 10, 2013

(65) Prior Publication Data
US 2015/0071051 A1     Mar. 12, 2015

(51) Int. Cl.
*H04W 72/12* (2009.01)
*H04W 74/08* (2009.01)
*H04B 7/04* (2006.01)

(52) U.S. Cl.
CPC ............ *H04W 72/121* (2013.01); *H04B 7/0452* (2013.01); *H04W 72/1278* (2013.01); *H04W 74/08* (2013.01)

(58) Field of Classification Search
None
See application file for complete search history.

(56) References Cited

U.S. PATENT DOCUMENTS

| | | |
|---|---|---|
| 5,615,212 A | 3/1997 | Ruszczyk et al. |
| 5,886,993 A | 3/1999 | Ruszczyk et al. |
| 6,198,728 B1 | 3/2001 | Hulyalkar et al. |
| 6,795,421 B1 | 9/2004 | Heinonen et al. |
| 6,807,158 B2 | 10/2004 | Krishnamurthy et al. |
| 6,813,277 B2 | 11/2004 | Edmon et al. |
| 6,868,072 B1 | 3/2005 | Lin et al. |
| 6,925,064 B2 | 8/2005 | Hester et al. |
| 7,079,812 B2 | 7/2006 | Miller et al. |
| 7,088,702 B2 | 8/2006 | Shvodian |
| 7,127,254 B2 | 10/2006 | Shvodian et al. |
| 7,184,767 B2 | 2/2007 | Gandolfo |
| 7,197,025 B2 | 3/2007 | Chuah |

(Continued)

OTHER PUBLICATIONS

IEEE P802.11e/D13.0, "IEEE Standard for Information Technology—Telecommunications and Information Exchange Between Systems—Local and Metropolitan Area Networks—Specific Requirements: Part 11: Wireless LAN Medium Access Control (MAC) and Physical Layer (PHY) Specifications: Amendment: Medium Access Control (MAC) Quality of Service (QoS) Enhancements," LAN/MAN Committee, IEEE Computer Society, Jan. 2005, IEEE, New York, NY, pp. i-182, United States.

(Continued)

*Primary Examiner* — Timothy J Weidner
(74) *Attorney, Agent, or Firm* — Sherman IP LLP; Kenneth L. Sherman; Steven Laut

(57) ABSTRACT

Wireless communication in a wireless network comprises obtaining a transmission opportunity period (TXOP) for communicating with an access point (AP) over a wireless communication channel. An announcement is sent to the AP to share the transmission opportunity period among wireless stations, as a multi-user transmission opportunity period for simultaneously transmitting data from said wireless stations to the AP on multiple uplink (UL) spatial streams over the wireless channel. Correctly received UL frames received by the AP are acknowledged. Error recovery and backoff processing are performed upon loss of communication information based on frame type.

28 Claims, 20 Drawing Sheets

(56) References Cited

U.S. PATENT DOCUMENTS

| | | | |
|---|---|---|---|
| 7,251,235 B2 | 7/2007 | Wentink et al. |
| 7,280,518 B2 | 10/2007 | Montano et al. |
| 7,280,801 B2 | 10/2007 | Dahl |
| 7,339,916 B2 | 3/2008 | Kwon et al. |
| 7,356,341 B2 | 4/2008 | Nanda |
| 7,359,398 B2 | 4/2008 | Sugaya |
| 7,385,943 B2 | 6/2008 | Niddam |
| 7,388,833 B2 | 6/2008 | Yuan et al. |
| 7,400,899 B2 | 7/2008 | Shin et al. |
| 7,447,174 B2 | 11/2008 | Joshi |
| 7,447,180 B2 | 11/2008 | Jeong et al. |
| 7,474,686 B2 | 1/2009 | Ho |
| 7,480,266 B2 | 1/2009 | Murty et al. |
| 7,486,650 B2 | 2/2009 | Trainin |
| 7,539,930 B2 | 5/2009 | Ginzburg et al. |
| 7,545,771 B2 | 6/2009 | Wentink et al. |
| 7,561,510 B2 | 7/2009 | Imamura et al. |
| 7,570,656 B2 | 8/2009 | Raphaeli et al. |
| 7,590,078 B2 | 9/2009 | Nanda |
| 7,623,542 B2 | 11/2009 | Yonge et al. |
| 7,634,275 B2 | 12/2009 | Odman |
| 7,664,030 B2 | 2/2010 | Sugaya |
| 7,664,132 B2 | 2/2010 | Beneveniste |
| 7,680,150 B2 | 3/2010 | Liu et al. |
| 7,684,380 B2 | 3/2010 | Odman |
| 7,697,448 B2 | 4/2010 | Karaoguz |
| 7,787,487 B2 | 8/2010 | Liu |
| 7,804,804 B2 | 9/2010 | Sugaya et al. |
| 7,860,054 B2 | 12/2010 | Beneveniste |
| 7,881,340 B2 | 2/2011 | Farrag et al. |
| 7,924,805 B2 | 4/2011 | Nishibayashi et al. |
| 7,944,897 B2 | 5/2011 | Shao et al. |
| 7,974,261 B2 | 7/2011 | Lane et al. |
| 8,068,449 B2 | 11/2011 | Beneveniste |
| 8,072,961 B2 | 12/2011 | Takano |
| 8,089,946 B2 | 1/2012 | Brommer |
| 8,107,424 B2 | 1/2012 | Li et al. |
| 8,107,993 B2 | 1/2012 | Toshimitsu et al. |
| 8,179,867 B2 | 5/2012 | Seok |
| 8,194,626 B2 | 6/2012 | Moorti et al. |
| 8,437,317 B2 | 5/2013 | Jang et al. |
| 8,532,221 B2 | 9/2013 | Liu et al. |
| 8,976,741 B2 | 3/2015 | Wentink |
| 8,989,106 B2 | 3/2015 | Abraham et al. |
| 2003/0003905 A1 | 1/2003 | Shvodian |
| 2003/0137970 A1 | 7/2003 | Odman |
| 2003/0137993 A1 | 7/2003 | Odman |
| 2003/0214967 A1 | 11/2003 | Heberling |
| 2004/0047319 A1 | 3/2004 | Elg |
| 2004/0214571 A1 | 10/2004 | Hong |
| 2004/0218683 A1 | 11/2004 | Batra et al. |
| 2004/0264475 A1 | 12/2004 | Kowalski |
| 2005/0058151 A1 | 3/2005 | Yeh |
| 2005/0130634 A1 | 6/2005 | Godfrey |
| 2005/0135318 A1 | 6/2005 | Walton et al. |
| 2005/0232275 A1 | 10/2005 | Stephens |
| 2006/0002428 A1 | 1/2006 | Trainin |
| 2006/0050742 A1 | 3/2006 | Grandhi et al. |
| 2006/0166683 A1 | 7/2006 | Sharma et al. |
| 2006/0176908 A1 | 8/2006 | Kwon et al. |
| 2006/0193279 A1 | 8/2006 | Gu et al. |
| 2007/0280180 A1 | 12/2007 | Dalmases et al. |
| 2008/0159208 A1 | 7/2008 | Kloker et al. |
| 2008/0279204 A1 | 11/2008 | Pratt et al. |
| 2009/0052389 A1 | 2/2009 | Qin et al. |
| 2009/0086706 A1 | 4/2009 | Huang et al. |
| 2009/0092086 A1 | 4/2009 | Lee et al. |
| 2009/0275292 A1 | 11/2009 | Chang |
| 2009/0285163 A1 | 11/2009 | Zhang et al. |
| 2009/0323611 A1 | 12/2009 | Singh et al. |
| 2010/0002639 A1 | 1/2010 | Qin et al. |
| 2010/0046453 A1 | 2/2010 | Jones et al. |
| 2010/0046518 A1 | 2/2010 | Takagi et al. |
| 2010/0220601 A1 | 9/2010 | Vermani et al. |
| 2010/0310003 A1 | 12/2010 | Lauer et al. |
| 2011/0002319 A1 | 1/2011 | Husen et al. |
| 2011/0064013 A1 | 3/2011 | Liu et al. |
| 2011/0090855 A1* | 4/2011 | Kim ............................... 370/329 |
| 2011/0176627 A1 | 7/2011 | Wu et al. |
| 2011/0235513 A1 | 9/2011 | Ali |
| 2011/0255618 A1 | 10/2011 | Zhu et al. |
| 2011/0268054 A1* | 11/2011 | Abraham et al. ............. 370/329 |
| 2011/0317630 A1 | 12/2011 | Zhu et al. |
| 2012/0008490 A1 | 1/2012 | Zhu |
| 2012/0060075 A1* | 3/2012 | Gong et al. ................... 714/776 |
| 2012/0082200 A1 | 4/2012 | Verikoukis et al. |
| 2012/0087358 A1 | 4/2012 | Zhu et al. |
| 2012/0140615 A1 | 6/2012 | Gong |
| 2012/0218947 A1 | 8/2012 | Merlin et al. |
| 2012/0314694 A1 | 12/2012 | Hsieh |
| 2013/0229996 A1* | 9/2013 | Wang et al. ................... 370/329 |
| 2013/0259017 A1 | 10/2013 | Zhang et al. |
| 2013/0286959 A1 | 10/2013 | Lou et al. |
| 2013/0301551 A1 | 11/2013 | Ghosh et al. |
| 2014/0010144 A1 | 1/2014 | Liu et al. |
| 2014/0119288 A1 | 5/2014 | Zhu et al. |
| 2014/0126509 A1 | 5/2014 | You |
| 2014/0269544 A1 | 9/2014 | Zhu et al. |
| 2014/0328262 A1 | 11/2014 | Sampath et al. |

OTHER PUBLICATIONS

IEEE Wireless LAN Edition, "A Compilation Based on IEEE Std. 802.11TM-1999 (R2003) and Its Amendments," IEEE Press, 2003, pp. 1-678, United States.

Mujtaba, S.A., "TGn Sync Proposal Technical Specification," IEEE 802.11-04-0889r7, IEEE P802.11: Wireless LANs, Jul. 8, 2005, pp. 1-133, United States.

Kim, S. et al., "QoS Enhancement Scheme of EDCF in IEEE 802.11e Wireless LANs," Electronics Letters, vol. 40, No. 17, IEEE, Aug. 19, 2004, pp. 1091-1092, United States.

IEEE 802.11-2007, "IEEE Standard for Information Technology—Telecommunications and Information Exchange Between Systems—Local and Metropolitan Area Networks—Specific requirements: Part 11: Wireless LAN Medium Access Control (MAC) and Physical Layer (PHY) Specifications," 2007 Revision of IEEE Std 802.11-1999, IEEE Computer Society, Jun. 12, 2007, pp. i-1184, United States.

International Search Report dated Jan. 9, 2009 for International Application No. PCT/KR2008/004793 from Korean Intellectual Property Office, filed Aug. 19, 2008, pp. 1-2, Seo-gu, Daejeon, Republic of Korea.

Harada, H., "Unified and Flexible Millimeter Wave WPAN Systems Supported by Common Mode," IEEE P802.15 Working Group for Wireless Personal Area Networks (WPANs), IEEE 802.15-07-0761-10-003c, Sep. 18, 2007, Slides 1-62, United States.

Mirkovic, J. et al., "A MAC Protocol With Multi-User MIMO Support for Ad-Hoc-WLANs", The 18th Annual IEEE International Symposium on Personal, Indoor and Mobile Radio Communications (PIMRC'07), IEEE, 2007, pp. 1-5, United States.

Stacy, R. et al., "DL MU-MIMO Ack Protocol (IEEE 802.11-09/1172r0)", IEEE, Nov. 16, 2009, pp. 1-8, United States.

IEEE Computer Society, "IEEE Std 802®-2001 (R2007), IEEE Standard for Local and Metropolitan Area Networks: Overview and Architecture", IEEE, Feb. 7, 2002, pp. i-36, New York, United States.

Camp, J.D. et al., "The IEEE 802.11s Extended Service Set Mesh Networking Standard", IEEE Communications Magazine, vol. 46, No. 8, IEEE, Aug. 2008, pp. 1-6, United States.

Morioka, Y. et al., "Multi-RTS Proposal", IEEE 802.11-10/1124r01, Sep. 12, 2010, Slides 1-14, IEEE, USA.

U.S. Non-Final Office Action mailed Oct. 26, 2011 for U.S. Appl. No. 12/455,438.

U.S. Final Office Action mailed Apr. 12, 2012 for U.S. Appl. No. 12/455,438.

U.S. Non-Final Office Action mailed Jul. 11, 2013 for U.S. Appl. No. 12/455,438.

U.S. Notice of Allowance mailed Oct. 21, 2013 for U.S. Appl. No. 12/455,438.

U.S. Non-Final Office Action mailed Jun. 6, 2012 for U.S. Appl. No. 12/415,981.

(56) References Cited

OTHER PUBLICATIONS

U.S. Final Office Action mailed Dec. 19, 2012 for U.S. Appl. No. 12/415,981.
U.S. Advisory Action mailed Mar. 8, 2013 for U.S. Appl. No. 12/415,981.
U.S. Non-Final Office Action mailed Aug. 8, 2013 for U.S. Appl. No. 12/415,981.
U.S. Final Office Action mailed Jan. 14, 2014 for U.S. Appl. No. 12/414,981.
U.S. Notice of Allowance mailed Apr. 10, 2014 for U.S. Appl. No. 12/415,981.
U.S. Non-Final Office Action mailed Jun. 9, 2009 for U.S. Appl. No. 11/589,519.
U.S. Final Office Action mailed May 12, 2010 for U.S. Appl. No. 11/589,519.
U.S. Notice of Allowance mailed Jan. 24, 2011 for U.S. Appl. No. 11/589,519.
U.S. Non-Final Office Action mailed Jun. 27, 2006 for U.S. Appl. No. 11/044,600.
U.S. Non-Final Office Action mailed Aug. 21, 2007 for U.S. Appl. No. 11/044,600.
U.S. Final Office Action mailed Jan. 15, 2008 for U.S. Appl. No. 11/044,600.
U.S. Non-Final Office Action mailed Aug. 7, 2008 for U.S. Appl. No. 11/044,600.
U.S. Non-Final Office Action mailed Jan. 25, 2007 for U.S. Appl. No. 11/044,600.
U.S. Advisory Action mailed May 15, 2008 for U.S. Appl. No. 11/044,600.
U.S. Restriction Requirement for U.S. Appl. No. 13/030,070 mailed Nov. 5, 2013.
U.S. Non-Final Office Action for U.S. Appl. No. 13/030,070 mailed May 15, 2014.
U.S. Non-Final Office Action for U.S. Appl. No. 13/177,386 mailed Dec. 17, 2013.
U.S. Non-Final Office Action for U.S. Appl. No. 12/821,940 mailed May 29, 2012.
U.S. Final Office Action for U.S. Appl. No. 12/821,940 mailed Aug. 21, 2012.
U.S. Non-Final Office Action for U.S. Appl. No. 12/821,940 mailed Jun. 24, 2014.
U.S. Notice of Allowance for U.S. Appl. No. 12/821,940 mailed Oct. 31, 2014.
U.S. Supplemental Notice of Allowability for U.S. Appl. No. 12/821,940 mailed Dec. 8, 2014.
U.S. Supplemental Notice of Allowability for U.S. Appl. No. 12/821,940 mailed Dec. 19, 2014.
U.S. Restriction Requirement for U.S. Appl. No. 13/253,926 mailed Oct. 10, 2013.
U.S. Non-Final Office Action for U.S. Appl. No. 13/253,926 mailed Nov. 25, 2013.
U.S. Final Office Action for U.S. Appl. No. 13/253,926 mailed Apr. 29, 2014.
U.S. Advisory Action for U.S. Appl. No. 13/253,926 mailed Jul. 11, 2014.
U.S. Notice of Allowance for U.S. Appl. No. 13/253,926 mailed Aug. 15, 2014.
U.S. Supplemental Notice of Allowability for U.S. Appl. No. 13/253,926 mailed Oct. 15, 2014.
U.S. Supplemental Notice of Allowability for U.S. Appl. No. 13/253,926 mailed Nov. 26, 2014.
U.S. Non-Final Office Action U.S. Appl. No. 13/664,602 mailed Feb. 18, 2015.
U.S. Final Office Action U.S. Appl. No. 13/664,602 mailed May 28, 2015.
U.S. Notice of Allowance U.S. Appl. No. 13/664,602 mailed Sep. 2, 2015.
U.S. Non-Final Office Action for U.S. Appl. No. 14/023,195 mailed Aug. 14, 2015.

* cited by examiner

| Applicable frame (sub) types | Bits 0-3 | Bit 4 | Bits 5-6 | Bit 7 | Bit 8 | Bit 9 | Bit 10 | Bits 11-15 |
|---|---|---|---|---|---|---|---|---|
| QoS Data and QoS Data+CF-Ack frames sent by non-AP STAs(11n) that are not a (#11082)TPU buffer STA or a (#11z)TPU sleep STA(11z) in a non-mesh BSS(11s) | TID | 0 | Ack Policy | A-MSDU Present | TXOP Duration Requested | | | |
| | TID | 1 | Ack Policy | A-MSDU Present | Queue Size | | | |
| QoS Null frames sent by non-AP STAs(11n) that are not a (#11082)TPU buffer STA or a (#11z)TPU sleep STA(11z) in a non-mesh BSS(11s) | TID | 0 | Ack Policy | Reserved | TXOP Duration Requested | | | |
| | TID | 1 | Ack Policy | Reserved | Queue Size | | | |

| Multi-TID subfield value | Compressed Bitmap subfield value | BlockAck frame variant |
|---|---|---|
| 0 | 0 | Basic BlockAck |
| 0 | 1 | Compressed BlockAck |
| 1 | 0 | Reserved |
| 1 | 1 | Multi-TID BlockAck |

ACKNOWLEDGEMENT, ERROR RECOVERY AND BACKOFF OPERATION OF UPLINK MULTI-USER MULTIPLE-INPUT-MULTIPLE-OUTPUT COMMUNICATION IN WIRELESS NETWORKS

TECHNICAL FIELD

One or more embodiments relate generally to wireless networks, and in particular, to acknowledging received data frames at an access point (AP), recovering from transmission errors, and backoff procedures when collisions are detected in wireless networks.

BACKGROUND

In a typical wireless network utilizing a coordination function for coordinating transmissions among wireless stations, such a function may be implemented in one of the wireless stations or a coordinator device such as an access point (AP). The wireless stations may communicate via directional transmissions using sector antennas and beamforming antenna arrays. The coordinator device may use omnidirectional transmissions for broadcasts to all wireless stations in all directions (e.g., 360 degrees range). Alternatively, the coordinator may use quasi-omnidirectional transmissions for broadcasts to a wide range, but not necessarily in all directions. In many wireless area networks (WLANs) such as those according to IEEE 802.11 standards, a coordinator station in infrastructure mode is used for providing contention-free access to a wireless communication medium to support Quality of Service (QoS) for certain applications.

In the absence of a coordinator, to provide contention-free channel time reservation, existing techniques use announcement or information exchange among wireless stations in a network to negotiate/reserve the use of the communication medium. For example, IEEE 802.11e Enhanced Distributed Channel Access (EDCA) provides QoS support for certain applications using announcement or information exchange. EDCA defines four Access Categories (ACs) and introduces service differentiation such that certain data traffic uses higher priority parameters to contend for the communication medium.

Further, a frame structure is used for data transmission between wireless stations such as a transmitter station and a receiver station. In one example, a frame structure in a Media Access Control (MAC) layer and a physical (PHY) layer is utilized, wherein in a transmitter station, a MAC layer receives a MAC Service Data Unit (MSDU) and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. The PHY layer includes transmission hardware for transmitting data bits over a wireless link. Before transmission as a frame from the transmitter station to the receiver station, a preamble is attached to the PPDU, wherein the preamble can include channel estimation and synchronization information.

EDCA allows contention for transmission opportunities (TXOPs), wherein a TXOP is a time interval when a quality of service (QoS) wireless station (STA) may initiate frame transfer on the wireless medium (e.g., wireless channel). The TXOP may be assigned to the wireless station by a coordinator, or the wireless station may obtain the TXOP by successfully contending for the wireless channel.

SUMMARY

One or more embodiments relate to a wireless communication in a wireless network. In one embodiment, a method for wireless communication comprises obtaining a transmission opportunity (TXOP) period for communicating with an access point (AP) over a wireless communication channel. An announcement is sent to the AP to share the transmission opportunity period among wireless stations, as a multi-user transmission opportunity period for simultaneously transmitting data from said wireless stations to the AP on multiple uplink (UL) spatial streams over the wireless channel. Correctly received UL frames received by the AP are acknowledged. Error recovery and backoff processing are performed upon loss of communication information based on frame type.

In one embodiment, a wireless station comprises a Physical Layer (PHY) for wireless communication over a wireless communication channel, a Media Access Control (MAC) layer, and a channel access module that obtains a transmission opportunity period (TXOP) for communicating with an AP over a wireless communication channel. In one embodiment, the channel access module sends an announcement to the AP to share the transmission opportunity period with at least another wireless station as a multi-user transmission opportunity period for simultaneously transmitting data from said wireless stations to the AP on multiple uplink (UL) spatial streams over the wireless channel, the AP acknowledges correctly received UL frames, and the channel access module performs error recovery and backoff processing upon loss of communication information based on frame type.

In one embodiment, a wireless AP comprises a Physical Layer (PHY) for wireless communication over a wireless communication channel, and a Media Access Control (MAC) layer that manages simultaneous transmissions from multiple wireless stations to the access point on multiple uplink (UL) spatial streams during a multi-user transmission opportunity period over a wireless channel. In one embodiment, the access point (AP) acknowledges correctly received UL frames and initiates error recovery and backoff processing upon loss of communication information based on frame type.

These and other features, aspects and advantages of the one or more embodiments will become understood with reference to the following description, appended claims and accompanying figures.

BRIEF DESCRIPTION OF THE DRAWINGS

FIG. 4 shows an example format for a QoS control field, according to an embodiment.

DETAILED DESCRIPTION

One or more embodiments relate to uplink (UL) multi-user multiple-input-multiple-output (MU-MIMO) communication in wireless networks. One or more embodiments allow simultaneously transmitting multiple uplink spatial streams from multiple wireless stations to an access point (AP) during a multi-user transmit opportunity over a wireless medium, such as a shared wireless radio frequency (RF) channel. One or more embodiments are further useful with simultaneously transmitting multiple downlink spatial streams to multiple wireless stations from the AP during a multi-user transmit opportunity over a wireless medium. One or more embodiments employ a multi-user transmit opportunity (MU-TXOP) mechanism for a wireless network to support multiple traffic streams for multiple wireless stations simultaneously. In one or more embodiments, correctly received UL frames received by the AP are acknowledged. Error recovery and backoff processing are performed upon loss of communication information based on frame type.

In one embodiment, wireless channel access protocols and a mechanism establish the UL MU-MIMO transmission. The channel access protocols extend the existing WLAN (IEEE 802.11) standard to support uplink MU-MIMO transmission (i.e., multiple stations sending data frames to an access point).

One embodiment provides a MAC protocol for enabling UL MU-MIMO transmissions. According to an embodiment, enhanced RTS/CTS frame (sometimes referred to as RTS+/CTS+ hereafter) exchanges are provided for initiating UL MU-MIMO transmissions. According to an embodiment, an ultra-high throughput (UHT) control wrapper frame with RTS/CTS frames is provided for initiating UL MU-MIMO transmissions. According to an embodiment, uplink transmission request (UTR) and uplink transmission indication (UTI) frames are provided for initiating UL MU-MIMO transmissions.

Uplink multi-user MIMO (UL MU-MIMO) protocol allows multiple traffic streams to be transmitted from different wireless stations (STAs) to a single access point (AP) simultaneously via multiple spatial streams, through the use of smart antennas and beamforming technology.

Figures 1A, 1B:
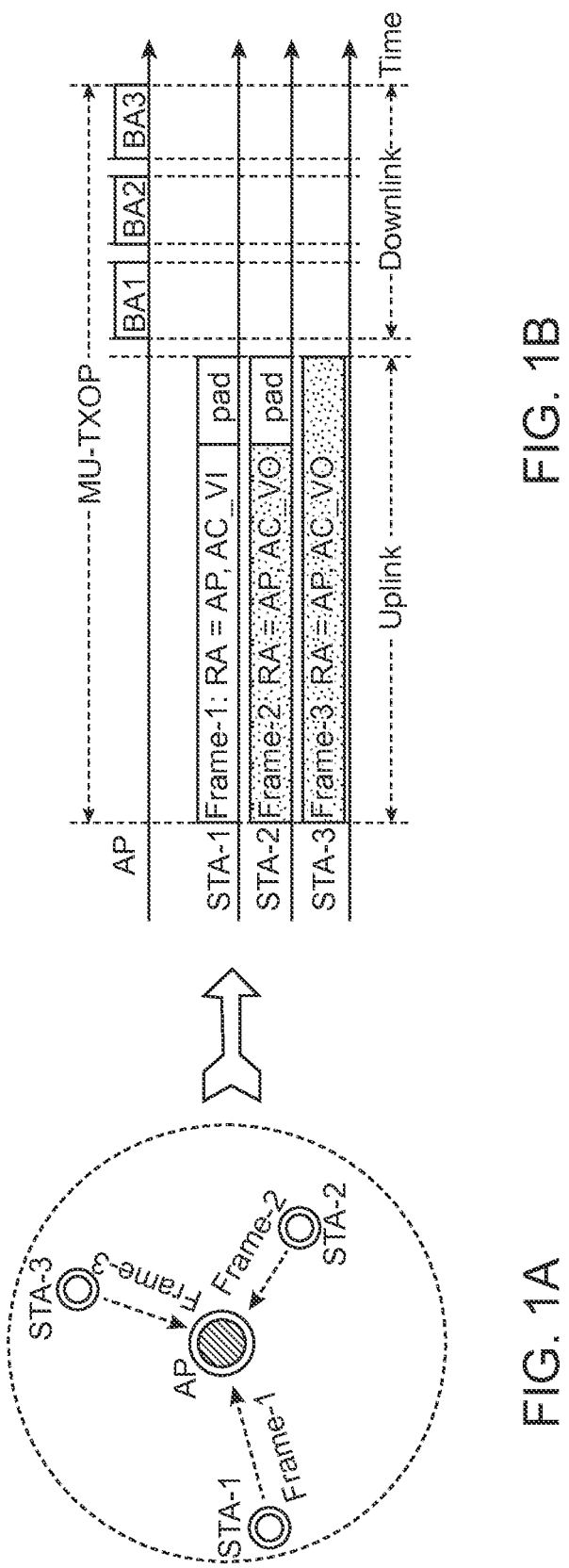
FIG. 1A shows a diagram of a wireless system implementing multi-user transmit opportunity (MU-TXOP) for wireless uplink multi-user multiple-input-multiple-output (UL MU-MIMO) communication, according to an embodiment.
FIG. 1B shows a process for UL MU-MIMO communication in FIG. 1A, according to an embodiment.

FIG. 1A illustrates an example in which three non-AP STAs transmit to one AP STA simultaneously. Specifically, FIG. 1A illustrates an uplink transmission involving multi-user MIMO transmission of frames Frame-1, Frame-2, Frame-3 from wireless stations STA-1, STA-2, STA-3 to an AP station during a MU-TXOP, respectively, via multi-path directional transmissions, according to an embodiment.

FIG. 1B shows a timing diagram for the example communication in FIG. 1A, wherein during a MU-TXOP, in an uplink (UL) phase, wireless stations STA-1, STA-2, STA-3 simultaneously and directionally transmit the three frames Frame-1, Frame-2, Frame-3 to the AP station respectively. Each of the frames Frame-1, Frame-2, Frame-3 includes a receiver address (RA) set to the AP station address. In a downlink phase, the AP station sends a block acknowledgement (BA) to each of the wireless stations STA-1, STA-2, STA-3 (i.e., BA1, BA2, BA3).

All three stations, STA-1 to STA-3, transmit at the same time to the AP through different spatial streams. Control and management frame exchanges are omitted for ease of illustration. The sequential acknowledgement scheme from the AP station shown in FIG. 1B is only one example of different acknowledgement scheme options.

Figure 2A:
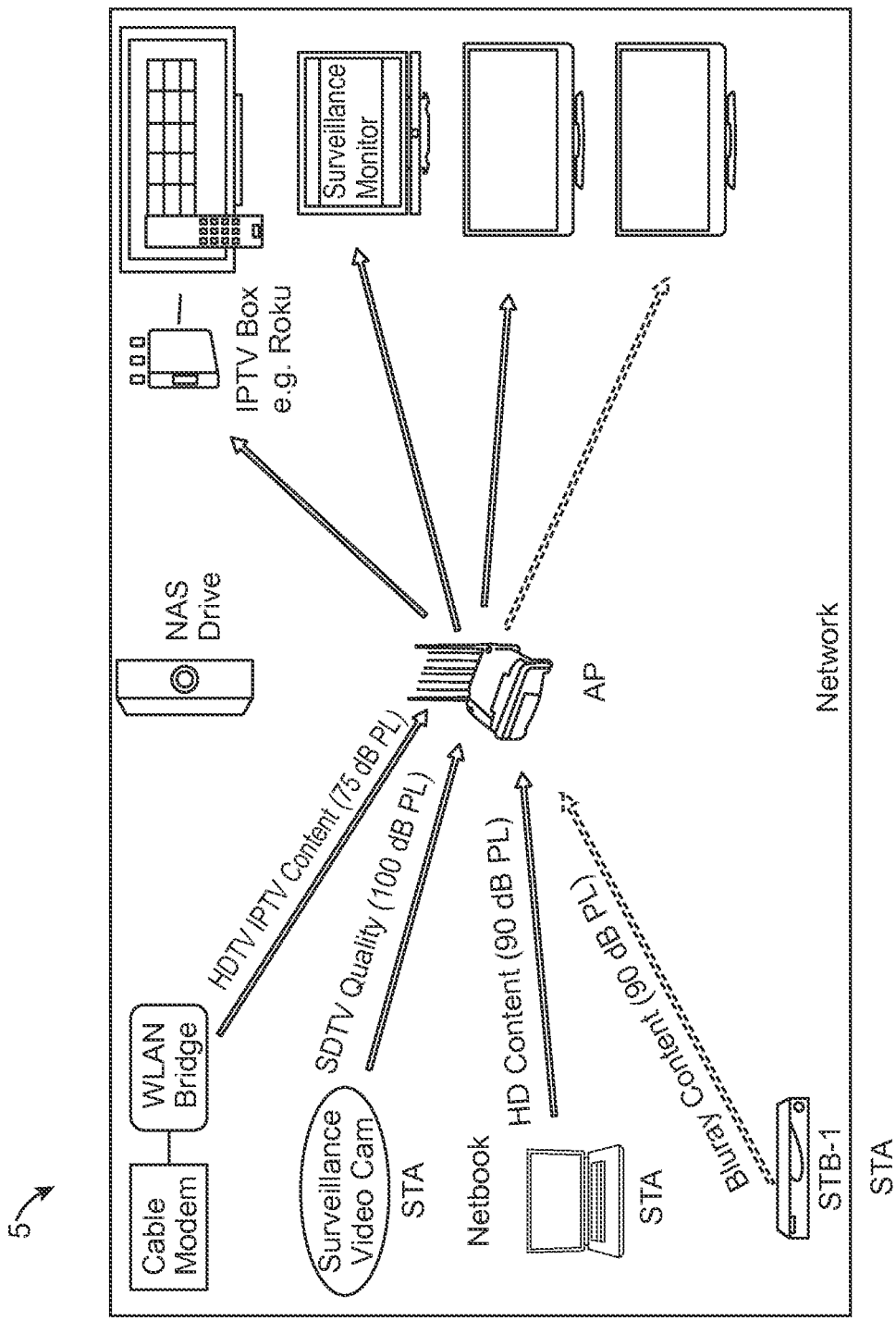
FIG. 2A shows an example wireless network implementing UL MU-MIMO communication, according to an embodiment.

FIG. 2A shows an example application of uplink MU-MIMO communication in a WLAN network 5, according to an embodiment. The network includes an AP station and several small-form-factor devices (i.e., STAs) that can only support 1-2 spatial streams. Such devices include, but not limited to, smartphones, netbooks, tablets, cameras, camcorders, multimedia players, video surveillance cameras, etc. Example applications of uplink MU-MIMO cover home network, enterprise, and hotspot scenarios.

As used herein, the term "UHT-capable device/STA" means a device/STA capable of performing uplink MU-MIMO communication functions. Enabling UL MU-MIMO transmission includes time synchronization, frequency synchronization, power control, enhanced AP capability, and enhanced MAC protocol. One or more embodiments provide enhanced TXOP sharing and operating rules for extending existing IEEE 802.11 MAC protocol, in order to support UL MU-MIMO transmissions. One or more embodiments address how to maintain fairness among STAs running EDCA protocol; how to inform the AP when a STA has uplink traffic to send to the AP; how to transmit multiple frames during an uplink TXOP; how to terminate an uplink TXOP when the TXOP owner STA has no more data to send; how to extend an uplink TXOP when the TXOP owner STA cannot finish transmission during the initially requested TXOP durations and the TXOP limited has not reached; and how to set network allocation vectors (NAVs) in different STAs in the basic service set (BSS).

According to one or more embodiments, a protocol for enabling UL MU-MIMO transmissions operates in the EDCA mode. Under EDCA operation rules, each STA contends for channel access using a distributed algorithm (i.e., CSMA/CA and a serial of channel access rules). The EDCA operation rules remain the same for UL MU-MIMO as in the current IEEE 802.11 standards, and therefore not detailed further herein.

Initiation Process for UL MU-MIMO Transmission

Figure 2B:
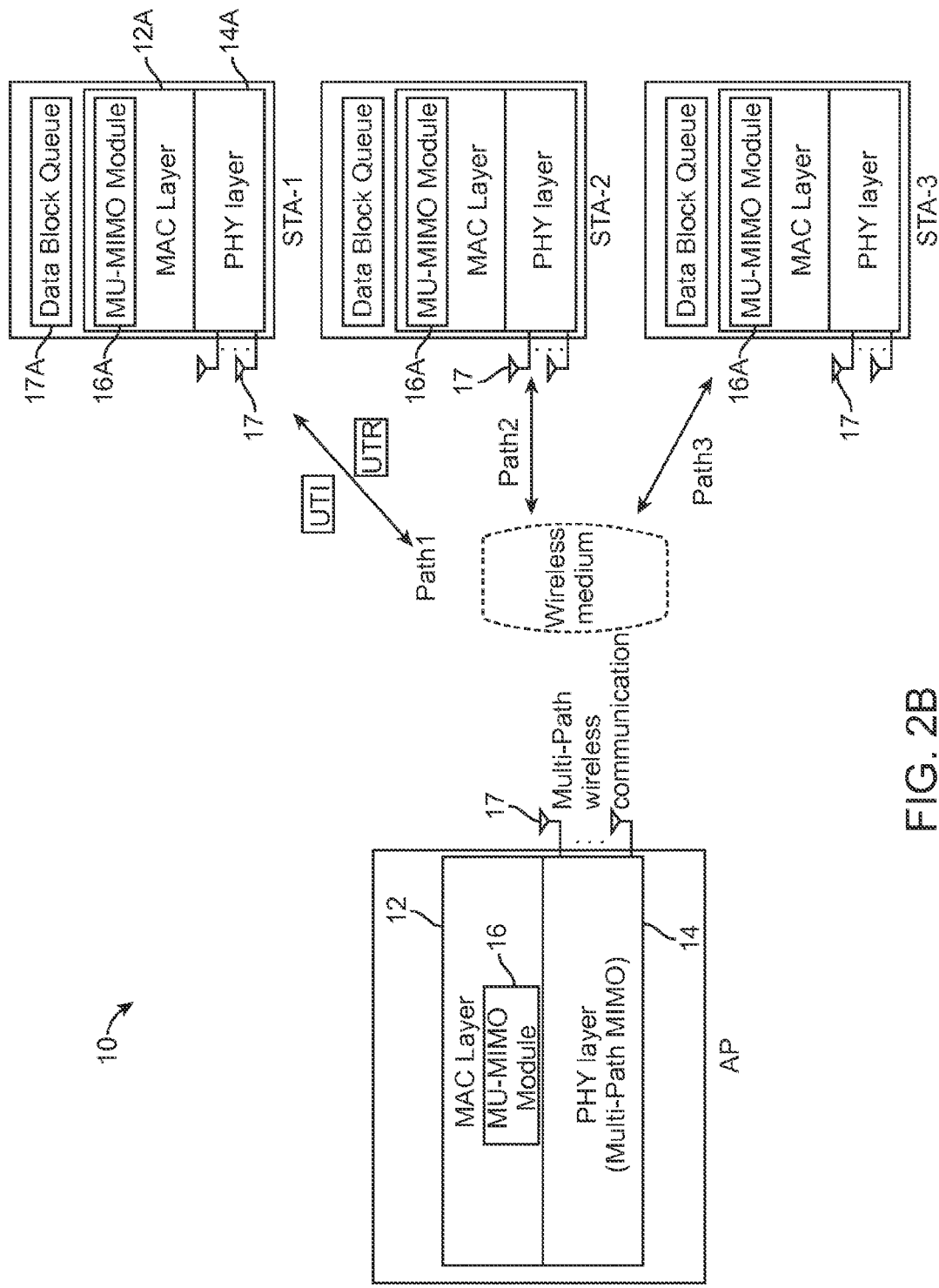
FIG. 2B shows a block diagram of a wireless network UL MU-MIMO communication, according to an embodiment.

FIG. 2B shows a wireless network 10, according to an embodiment. The wireless network comprises a wireless local area network (WLAN) comprising multiple wireless devices including STA-1, STA-2, STA-3 and AP. The AP manages simultaneous transmissions from multiple wireless stations to the access point on multiple uplink (UL) spatial streams during a multi-user transmission opportunity period over a wireless channel. The AP includes a MAC layer 12 and a PHY layer 14, wherein the MAC layer 12 includes a channel access module implemented as a MU-MIMO module 16 that provides EDCA MU-MIMO communication including UL MU-MIMO, according to an embodiment. Each of the wireless devices STA-1, STA-2, STA-3 includes a MAC layer 12A and a PHY layer 14A. Each STA MAC layer 12A includes a channel access module implemented as MU-MIMO module 16A that provides UL MU-MIMO, according to an embodiment.

Figure 2C:
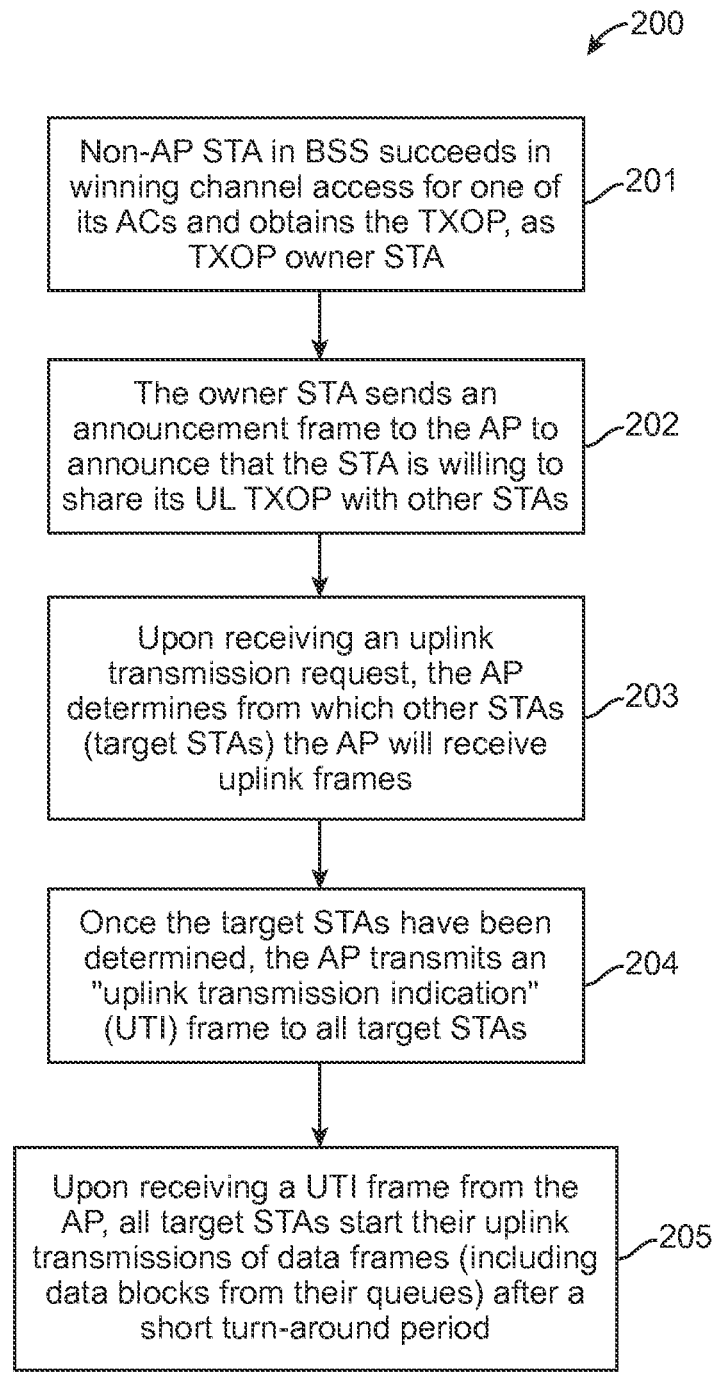
FIG. 2C shows an example uplink MU-MIMO process, according to an embodiment.

FIG. 2C shows an example uplink MU-MIMO process 200, according to an embodiment. The process 200 comprises process blocks described below. Process block 201: An initiation process includes a frame exchange process before any user data can be transferred in UL MU-MIMO communication. An initiation of the MU-TXOP occurs when the EDCA rules permit access to the medium. An initiation process begins with one of the non-AP STAs in BSS succeeding in winning channel access for one of its ACs and obtains the TXOP. This STA becomes the TXOP owner STA.

Process block 202: The owner STA sends an announcement frame to the AP to announce that the STA is willing to share its UL TXOP with other STAs. Because the STA is the owner of the TXOP, it needs not request the right for transmission since the STA has the right to transmit already. The purpose of the announcement is to inform the AP that the STA is willing to share the UL TXOP with other STAs. Along with the announcement frame, additional information including the following is provided to the AP: (1) The requested TXOP duration and (2) The access category (AC) of the winning EDCAF (this information provides the AP the maximum TXOP duration that can be granted to the TXOP owner). The announcement frame may also be treated as the TXOP owner's request to the AP to start a UL MU-MIMO transmission.

Accordingly, the announcement frame is called an "uplink transmission request" (UTR) herein.

Process block 203: Upon receiving the uplink transmission request, the AP determines from which other STAs (i.e., target STA) the AP is expecting to receive uplink frames. The determination may be made based on each STA's request of TXOP duration and their queue size. The queue size indicates the number of frames in transmission queue 17A (FIG. 2B) of data blocks in each STA. This information is delivered to the AP via QoS control field carried in uplink QoS data frames sent earlier.

Process block 204: Once the targeted STAs have been determined, the AP transmits an "uplink transmission indication" (UTI) frame to all targeted STAs with the following information: (1) A list of addresses of STAs that are allowed to transmit in the uplink phase during the MU-TXOP uplink phase and (2) the allowed uplink transmission time for each target STA.

Process block 205: Upon receiving a UTI frame from the AP, all target STAs in the address list start their uplink transmissions of data frames (including data blocks from their queues) immediately after a short turn-around period, such as Short Interframe Space (SIFS) period. The SIFS period is to ensure the STA uplink transmissions to the AP during the uplink phase of the MU-TXOP are synchronized in time so that the AP can correctly decode the data carried in the uplink data frames belonging to each target STA.

In the example shown in FIG. 2B, there are buffered data in the Data Block Queue 17A in all three stations STA-1, STA-2, and STA-3. During an UL MU-TXOP multiple traffic streams belonging to the same or different access categories from multiple wireless stations STA-1, STA-2, and STA-3 are transmitted simultaneously over a wireless medium over multiple wireless paths Path1, Path2, Path3. The AP and all three stations implement MU-MIMO over multiple antennas 17 (FIG. 2B).

A primary aspect of the general initiation process described above comprises exchange of the UTR and UTI frames. In a preferred embodiment, a UTR/UTI frame exchange protocol includes considerations of the following factors:

Transmission reliability—the AP needs to receive the UTR frame reliably and all STAs need to receive the UTI frame reliably.

Backward compatibility—legacy STAs do not need to act on the UTR/UTI frames but they need to be able to set their NAV values correctly.

Control overhead—UTR/UTI frames are transmitted at the basic-MCS data rates to reduce overhead.

As used herein, the acronyms UTR and UTI also refer to the functions of certain frames and also refer to concrete frame formats.

Figure 3A:
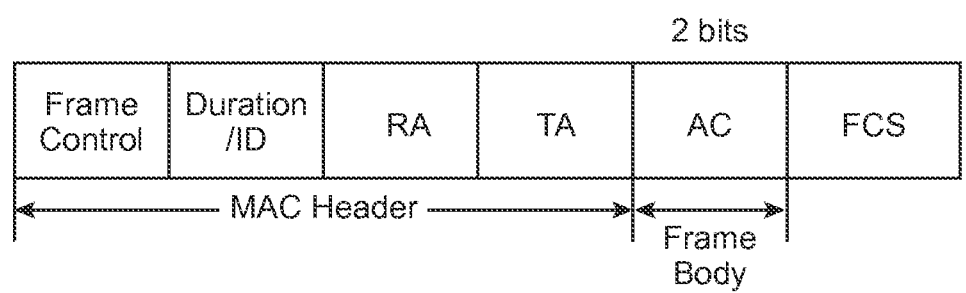
FIG. 3A shows an uplink transmission request (UTR) control frame for UL MU-MIMO communication, according to an embodiment.
Figure 3B:
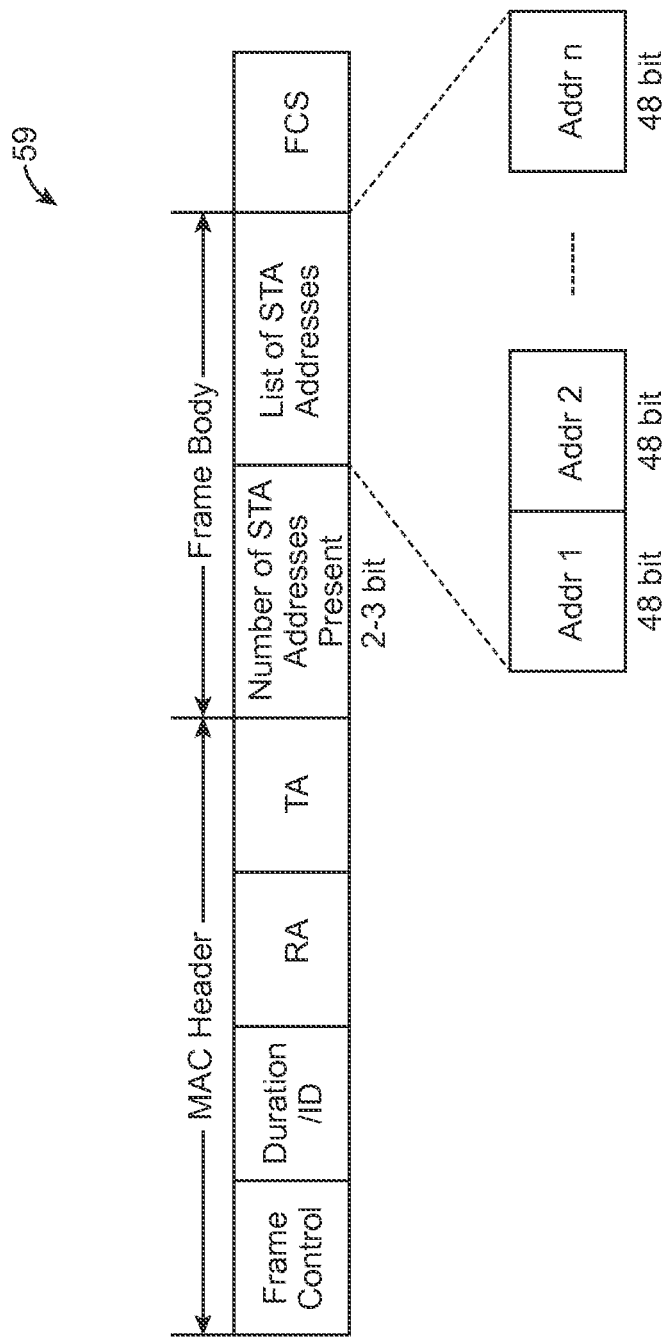
FIG. 3B shows an uplink transmission indication (UTI) control frame for UL MU-MIMO communication, according to an embodiment.

Initiation Process for UL MU-MIMO Transmission Using a Pair of Control Frames, UTR/UTI One example embodiment initiation process for UL MU-MIMO transmission includes using two control frames, UTR and UTI control frames. FIG. 3A illustrates a UTR control frame 57 and FIG. 3B illustrates a UTI control frame 59, according to an embodiment. A UTR frame 57 is generated by a STA that has won the channel access and is sent to the AP. In a UTR frame 57, the Duration/ID field indicates the requested TXOP duration plus any control overheads. The RA field contains the MAC address of the AP. And the Transmitter Address (TA) field contains the MAC address of the TXOP owner. The AC field in the frame body indicates the AC that wins the TXOP.

A UTI frame 59 is generated by the AP upon receiving the UTR and sent to the UTR sender, with other receiver addresses in the frame body. In an UTI frame 59, the Duration/ID field indicates the granted uplink TXOP duration plus any control overheads. The RA field contains the MAC address of the UTR sender. The Number of STA Addresses Present field indicates the number of STA addresses to be presented in the List of STA Addresses field. And the List of STA Addresses field contains the MAC addresses of the targeted STAs. To save control overhead, all 48-bit MAC addresses in the List of STA Addresses field may be replaced by 11-bit AID fields.

Figure 3C:
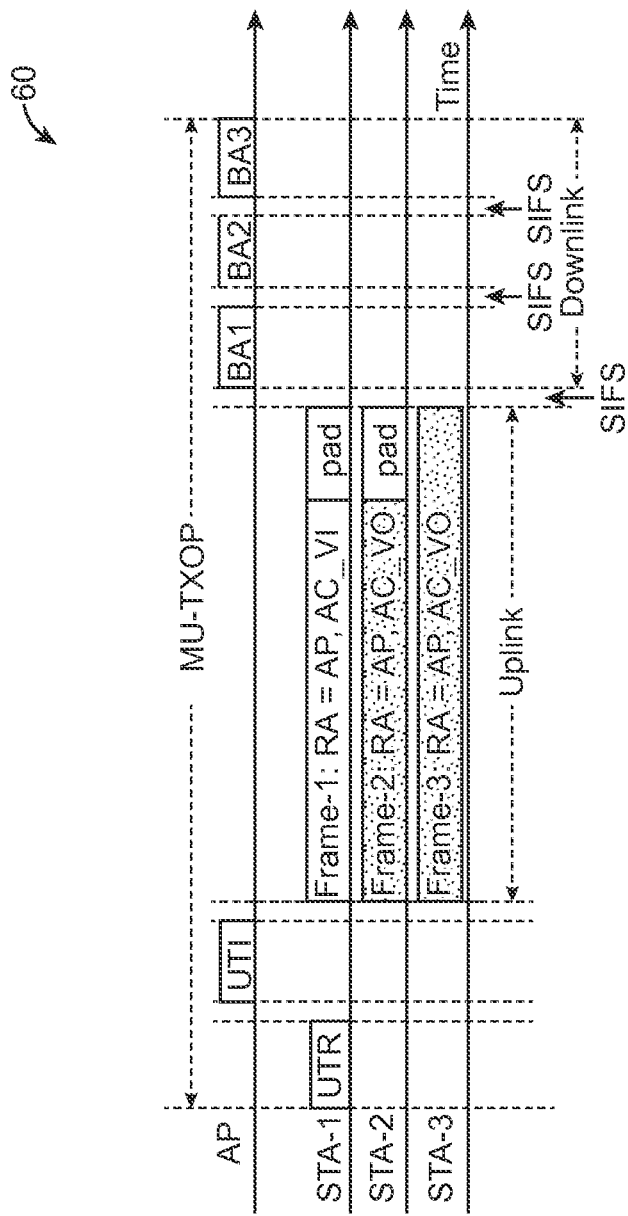
FIG. 3C shows an example initiation process for UL MU-MIMO communication and sequential acknowledgement of UL data frames, according to an embodiment.

FIG. 3C illustrates an exchange process 60 based on FIG. 1B, using the UTR and UTI control frames, for UL MU-MIMO communication according to one embodiment.

General UL MU-MIMO TXOP Operation Rules in the Enhanced Distributed Channel Access (EDCA) Environment EDCA is the mandatory operating mode in WLAN. In one embodiment, to maintain consistency and fairness of the EDCA channel access mechanism, the following general TXOP operating rules in UL MU-MIMO transmissions are defined. In one embodiment, the AP shall always grant the TXOP owner the duration it requested, as long as the requested duration does not exceed the limit of the specific AC. Note this is different from the case when the BSS is running in the hybrid coordination function (HCF) controlled channel access (HCCA) environment. In the HCCA case, the AP has the right not to grant the required TXOP duration to a STA. The AP shall always allow the TXOP owner to decide whether the TXOP should be terminated earlier than the previously granted end time, or it should be extended to a time that is within the TXOP limited. In other words, the AP shall not decide by itself whether and when to terminate or extend the current TXOP. As the TXOP owner, the STA shall ensure its operation is within the limit of the maximum TXOP duration allowed for its AC.

Reporting Buffer Size and the Time Required for Clearing the Buffer at STAs

FIG. 4 shows an example format for a QoS control field, according to an embodiment. In order for the AP to make right decisions on which STAs to poll for uplink transmissions, the AP needs to know the demand of transmission time from each STA. In one embodiment, the QoS Control field in the MAC header of a QoS data frame may be used for this purpose, which is different in the way it is used in a legacy MAC header although it is used under the legacy HCCA channel access mechanism. In one embodiment, a STA uses the QoS Data frame format to deliver its UL traffic. This is because a QoS Control field is optional and only exists in QoS frames. To report the traffic situation, in one embodiment a STA may use either the TXOP Duration Requested subfield or the Queue Size subfield in the QoS Control field.

Note both QoS Data and QoS Null frames are capable of delivering the TXOP Duration Requested information and the Queue Size information to the AP, according to one or more embodiments. Therefore, if a STA is polled by the AP for UL transmission using a UTI method, and it has no data to send, it should send a QoS Null frame back to the AP with "0" in the Queue Size subfield or "0" in the TXOP Duration Requested subfield, according to one embodiment. This may be useful if a STA has been idle for a while (therefore its current queue status is not known to the AP) and the AP has no other STAs which have traffic to send.

In one embodiment, TXOP Duration Requested subfield values are not cumulative. A TXOP duration requested for a particular traffic identifier (TID) supersedes any prior TXOP duration requested for that TID. A value of 0 in the TXOP Duration Requested subfield may be used to cancel a pending unsatisfied TXOP request when its MAC service data unit (MSDU) is no longer queued for transmission, according to one embodiment. The TXOP duration requested is inclusive of the PHY and IFS overhead, and a STA should account for this when attempting to determine whether a given transmission fits within a specified TXOP duration.

In one embodiment, a UHT-capable AP is required to indicate whether it processes the TXOP request or queue size in the QoS Info field in the Probe Response, and (Re) Association Response frames. In one embodiment, APs shall process requests in at least one format, either the TXOP Duration Requested subfield or the Queue Size subfield. Also note that in the EDCA environment, TID fields are optional and they may be ignored, according to one embodiment.

Multiple-Frame Transmission in a TXOP

Figure 5:
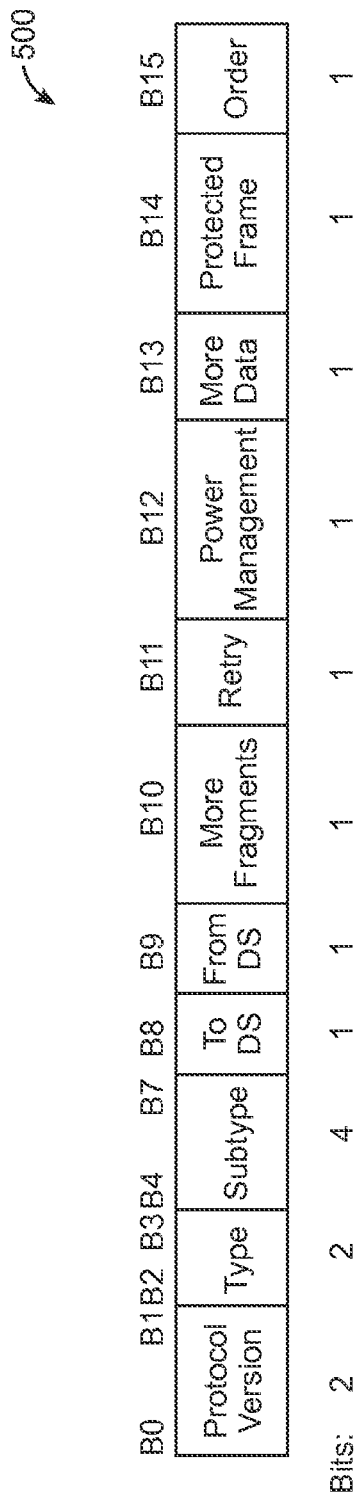
FIG. 5 shows an example format for a frame control field, according to an embodiment.

FIG. 5 shows an example format for a frame control field 500, according to an embodiment. In one embodiment, within the granted TXOP, the TXOP owner shall be able to transmit multiple PHY protocol data units (PPDUs) to the AP. To achieve this, in one embodiment the More Data subfield in the Frame Control field 500 in the MAC header is utilized.

The More Data subfield was originally created for an AP to inform a power-save STA that it has MAC data frames waiting to be delivered in its buffer so the STA should retrieve the frame before it goes back to doze mode. In one embodiment, for an UL MU-MIMO TXOP, the More Data subfield may be used by the TXOP owner to inform the AP that it has more data frame to be transmitted in the UL to the AP. In one embodiment, setting the More Data bit to "1" in a QoS Data frame indicates that the TXOP owner has more data frames to send to the AP. In one embodiment, setting the More Data bit to "0" in a QoS Data frame indicates this data frame is the last data frame the TXOP owner intended to transmit during this TXOP.

In one embodiment, upon receiving a data frame with the More Data subfield set to "1", the AP shall send a CF-Multi-Poll frame 600 (FIG. 6) to the TXOP owner and other STAs to poll for another round of UL transmission, if there is still time left (excluding the transmission time of the CF-Multi-Poll frame 600 and other overheads) within the originally requested TXOP. Note if all bits in the BA Present subfield (a bitmap) have a zero value, the CF-Multi-Poll+ACK frame is a pure CF-Multi-Poll frame 600. Otherwise, it may be used to acknowledge the previously received data frames, as well as to poll STAs for the next round of uplink transmission.

In one embodiment, although STAs other than the TXOP owner should also set the More Data subfield to reflect their transmission status, the information is only provided for the AP to determine whether they should be included in the next round of UL transmission; the information shall not affect the decision on whether to terminate or extend the current TXOP. For example, as long as the More Data subfield of the TXOP owner's QoS data frame is set to "0", the TXOP shall be terminated, even though the More Data subfields of one or more other STAs' QoS data frame are set to "1". The restriction is necessary for ensuring fairness among different STAs and different ACs.

In one embodiment, in any UL transmission phase, if a STA is not able to finish transmission in the given time indicated in the Duration field of the CF-Multi-Poll frame 600, it should send a QoS Null frame with the QoS Control field reflecting the current buffer size and the TXOP duration required to empty its queue. Note the AP may select different sets of STAs in different UL phases for transmission, as long as the TXOP owner is always polled in each of the uplink phases. To achieve this, in one embodiment the AP simply changes the STA addresses in the CF-Multi-Poll frame 600.

In one embodiment, to poll multiple STAs for uplink transmission, the CTS frame may include addresses of multiple targeted STAs. However, a legacy CTS frame has only one RA (Receiver Address) field and hence cannot carry multiple addresses. According to one or more embodiments, said polling function may be achieved by sending a conventional CTS frame followed by a CF-Multi-Poll frame created by one or more embodiments, which contains the MAC addresses of STAs from which the AP is expected to receive uplink data from, or sending the newly created CF-Multi-Poll frame only.

Figure 6:
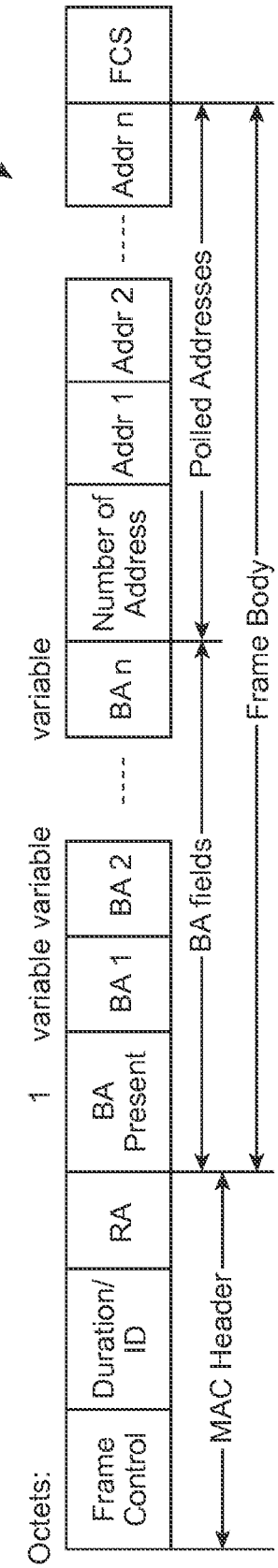
FIG. 6 shows a contention free (CF)-Multi-Poll+ACK frame for UL MU-MIMO communication, according to an embodiment.

FIG. 6 shows a CF-Multi-Poll+ACK frame for UL MU-MIMO communication, according to an embodiment. According to one embodiment, in this approach, a conventional (legacy or normal) CTS frame is first sent by the AP to the UTR sender STA with the duration field set to the requested TXOP duration plus any control overheads. Because this conventional CTS does not contain the address list of the targeted STAs, another frame needs to be sent for this purpose according to an embodiment. In one example embodiment, a QoS CF-Multi-Poll frame 600 is employed by the AP, wherein said frame has a Data frame subtype for polling all the targeted STAs for uplink transmission.

In one embodiment, in the frame 600, the Duration field reflects the requested TXOP plus any overhead (e.g., a SIFS). In one embodiment, the RA field contains the MAC address of the UTR sender. In one embodiment, the first field of the polled addresses, the Number of Address field, contains the number of additional receiver addresses (other than the UTR sender STA's address) carried in the frame body. For example, if the value of the Number of Address field equals to 4, then the frame body will contain 4 additional receiver addresses (n=4). In one embodiment, the frame 600 may contain other fields in the MAC Header, such as QoS Control and HT/UHT Control fields. Although frame 600 is a data frame, it is transmitted at one of the rates in the BSSBasicRateSet parameter in order to set the NAV of all STAs that are not being polled, according to one embodiment.

According to one embodiment, in this approach, the AP sends out the QoS CF-Multi-Poll frame 600 only as the response to a UTR frame, without sending the CTS frame first. In this case the frame exchange sequence becomes RTS/CF-Multi-Poll/Uplink Data. Although QoS CF-Multi-Poll is a data frame, it is transmitted at one of the rates in the BSS-BasicRateSet parameter in order to set the NAV of all STAs that are not being polled, according to one embodiment.

Figure 7:
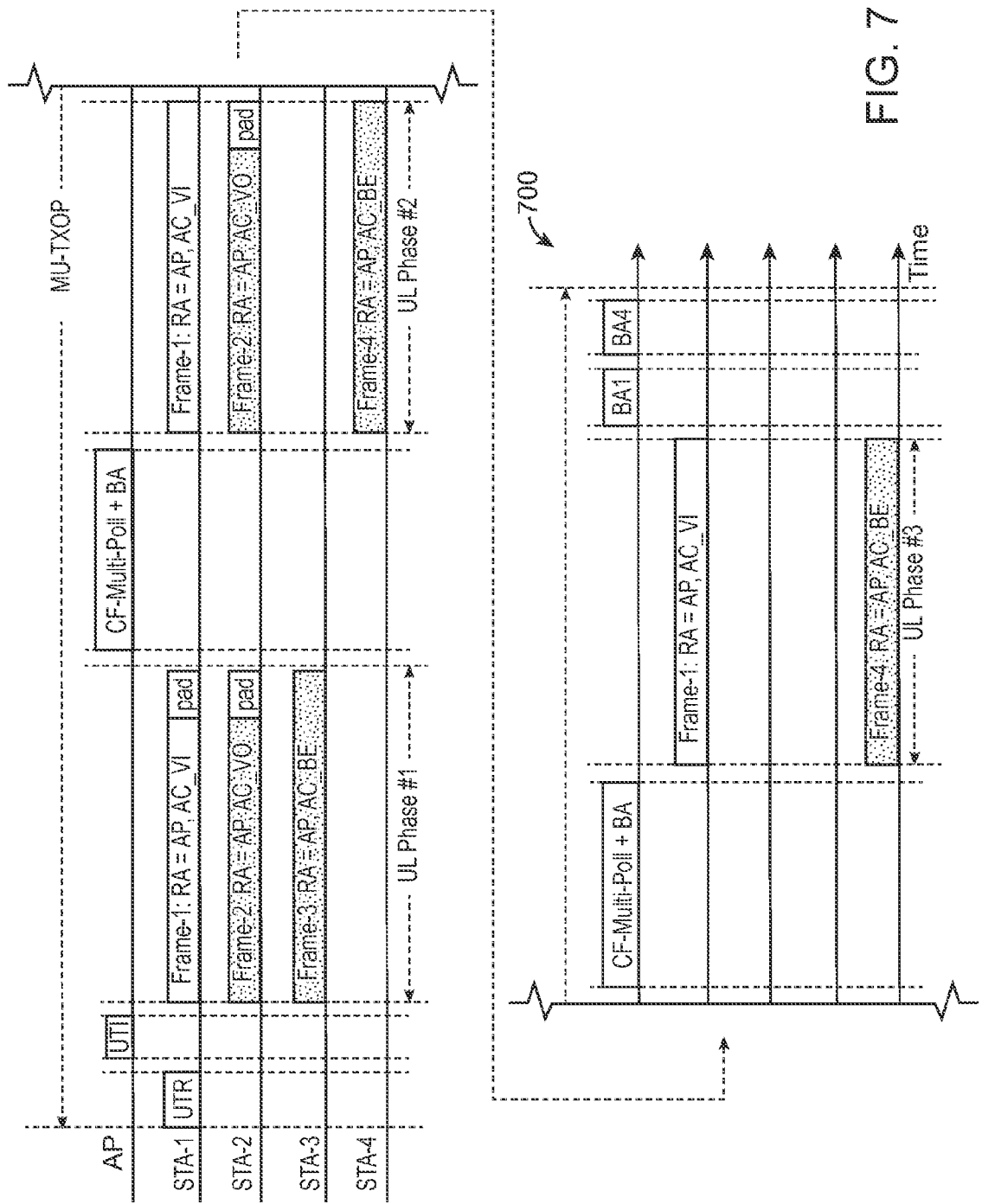
FIG. 7 shows an example UL MU-MIMO transmission, according to an embodiment.

FIG. 7 shows an example multiple frame transmission process 700 for UL MU-TXOP communication, according to an embodiment. In this example, in process 700 it is assumed that the AP may receive data frames from up to 3 STAs at one time. In the first uplink phase, transmissions were polled from STA-1, STA-2 and STA-3. In the second uplink phase, transmissions were polled from STA-1, STA-2 and STA-4, indicating a change of uplink STAs. In one embodiment, in process 700 the CF-Multi-Poll frames are also used to acknowledge the previously transmitted frames.

Acknowledgment of Received Frames

In one or more embodiments, to acknowledge correctly received UL frames from different STAs, the AP may use multiple approaches. In one embodiment, a sequential acknowledgement approach is used. In one embodiment, with the sequential acknowledgement approach, the AP sends ACK/BA (BlockAck) frames to each of the STAs one by one, according to the order they were polled for uplink transmission. In one embodiment, FIG. 3C shows the sequential acknowledgement approach. In one embodiment, in the sequential acknowledgement approach, two BA frames are separated by a SIFS inter-frame spacing time.

Figure 8:
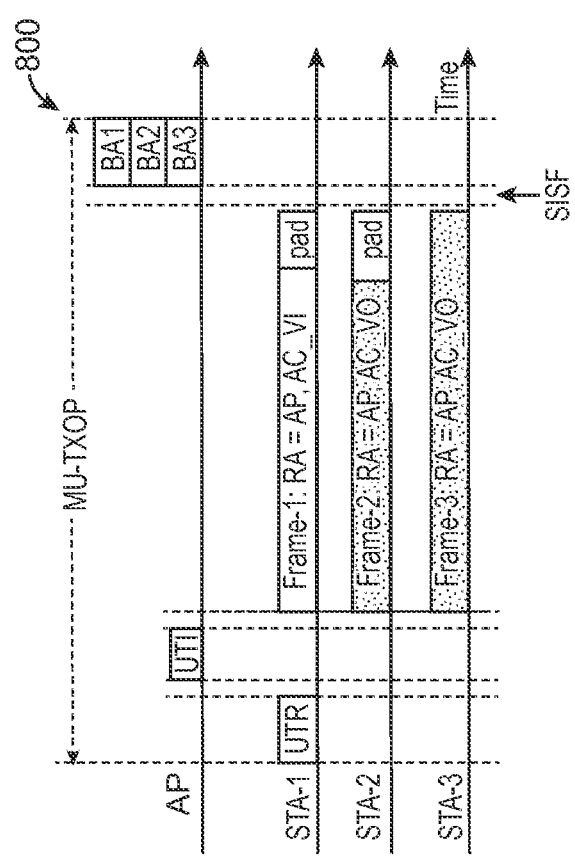
FIG. 8 shows an example of DL MU-MIMO acknowledgement of UL Data Frames, according to an embodiment.

FIG. 8 shows an example 800 of DL MU-MIMO acknowledgement of UL Data Frames, according to an embodiment. In one embodiment, in the DL MU-MIMO acknowledgement approach, the AP sends ACK/BA frames to each of the STAs in a signal DL MU-MIMO PPDU. In one embodiment, in the DL MU-MIMO acknowledgement approach, both the AP and the STAs must be IEEE 802.11ac-capable in order to send and receive DL MU-MIMO PPDUs. The Group ID in the BAs sending to the STAs may be set to a broadcast Group ID so Group ID assignment and management are not necessary for only supporting the UL MU-MIMO transmission, according to one embodiment.

In one embodiment, the CF-Multi-Poll frame (see FIG. 6) is used to acknowledge previously transmitted data frames, as well as to poll for the next round of UL transmission (this may be called a CF-Multi-Poll+ACK frame) according to one embodiment. In one embodiment, this approach may be called a piggyback acknowledgement approach and requires each UHT-capable STA process the CF-Multi-Poll frame, even if the address in the RA field of the MAC header does not match its own MAC address. In one embodiment, an acknowledgement subfield in the frame body field is defined as shown in FIG. 6.

Figure 9:
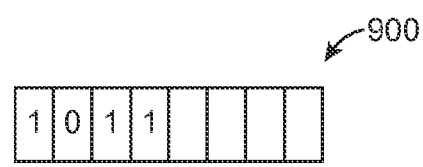
FIG. 9 shows an example of a BA Present Field, according to an embodiment.

FIG. 9 shows an example of a BA Present Field 900, according to an embodiment. In one embodiment, in the BA fields, the BA Present subfield is 8 bit in length and is a bitmap that indicates whether the corresponding STA has a BA in this frame and its order. In one embodiment, the order a STA presents in the UTR frame determines the order of its BA Present bit in the bitmap. In one example embodiment, if a STA is the third STA being polled in the CF-Multi-Poll frame, then its BA Present bit should be the third in the BA Present bitmap.

In one embodiment, when a STA's transmission was not received correctly by the AP, its corresponding bit in the BA Present bitmap should be set to "0"; otherwise, its corresponding bit in the BA Present bitmap should be set to "1". In one embodiment, a STA shall record its order when it was polled for the uplink transmission in order to determine its order in the BA Present field.

In one example embodiment, as indicated in FIG. 9, the AP was not able to receive the data frame sent by the second STA as in the UTR frame. Therefore, by reading the second bit, the second STA is informed that the data frame was not transmitted successfully. In one embodiment, each bit of the BA Present Field shall have the default value of "0". When a BA Present field has all-zero bits, it indicates that the frame is a CF-Multi-Poll frame, without the acknowledgement function.

Figure 10:
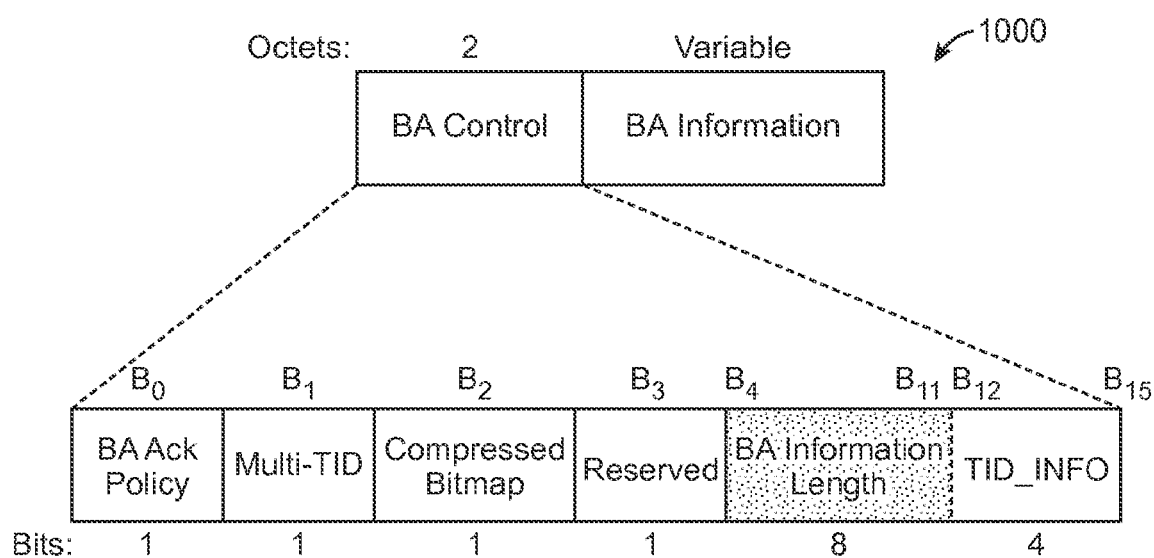
FIG. 10 shows details of a BA Field, according to an embodiment.

FIG. 10 shows details 1000 of a BA Field, according to an embodiment. In one embodiment, the BA fields (BA1 to BAn) are optional and only present when at least one of the 8 bits in the BA Present field is a non-zero bit. In one embodiment, the number of the non-zero bits in the BA Present field indicates the number of the BA fields that will follow. In one embodiment, the BA field was originally defined by 802.11n standard, in the BlockAck frame. In one embodiment, each BA field contains two subfields, a BA Control subfield and a BA Information subfield.

In one embodiment, a BA Control subfield is 2 octets in length. The original BA Control subfield has 9 reserved bits, B3-B11. In one embodiment, 8 of the 9 reserved bits (B4-B11) are used to create a new subfield called "BA Information Length". In one embodiment, the BA Information Length subfield is used to indicate the length, in octets, of following "BA information" subfield. This enables the receiving STA to correctly parse the frames received. In one embodiment, depending on the BA Ack Policy, the BA Information has different length.

Figures 11, 12:
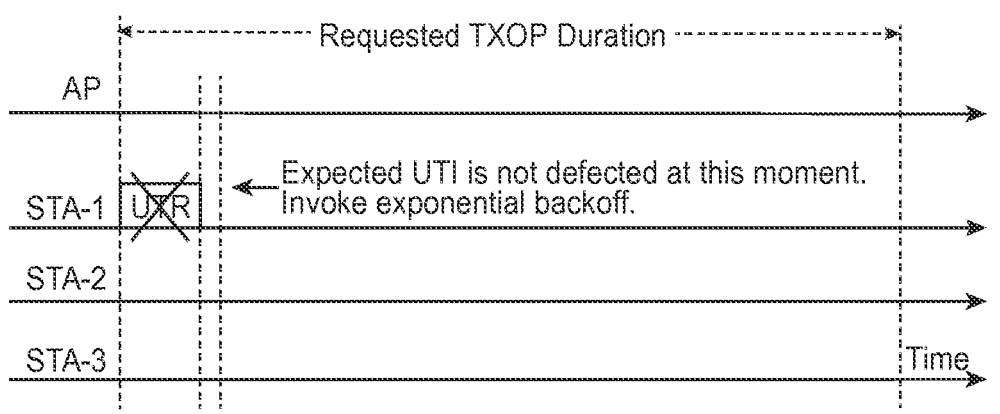
FIG. 11 shows a table of BlockAck Frame variant encoding, according to an embodiment.
FIG. 12 shows a first approach for error recovery and backoff for loss of a UTR frame, according to an embodiment.

FIG. 11 shows a table 1100 of BlockAck Frame variant encoding, according to an embodiment. In one embodiment, for a basic BlockAck, the BA Information is 130 octets; for a compressed BlockAck, the BA Information is 10 octets; for a Multi-TID BlockAck, the BA Information is 12 octets. In one embodiment, if the length of each BlockAck type is always fixed, the BA Information Length field may be saved (not needed). In one embodiment, a receiving STA may determine the length of the BA Information subfield by decoding the Multi-TID and the Compressed Bitmap subfields.

Error Recovery and Backoff Procedure

After sending out any form of a UTR (a RTS+, a RTS+ UHT, or a UTR), the TXOP owner waits for the corresponding UTI frame (a CTS+, a CTS+UHT, or a UTI) to start the UL transmission. If the PHY layer of the TXOP owner doesn't detect any transmission SIFS after the end of the UTR frame, the corresponding UTR frame is considered lost.

FIG. 12 shows a first approach 1200 for error recovery and backoff for loss of a UTR frame, according to an embodiment. In one example embodiment, because this is the initial frame exchange and it failed, it indicates contention exists in the network and the transmission should not continue. In this case, in one embodiment transmission failure is recognized at the TXOP owner STA and a backoff procedure is performed for this AC; the contention window (CW) is incremented and a random timer value is selected within the CW.

Figure 13:
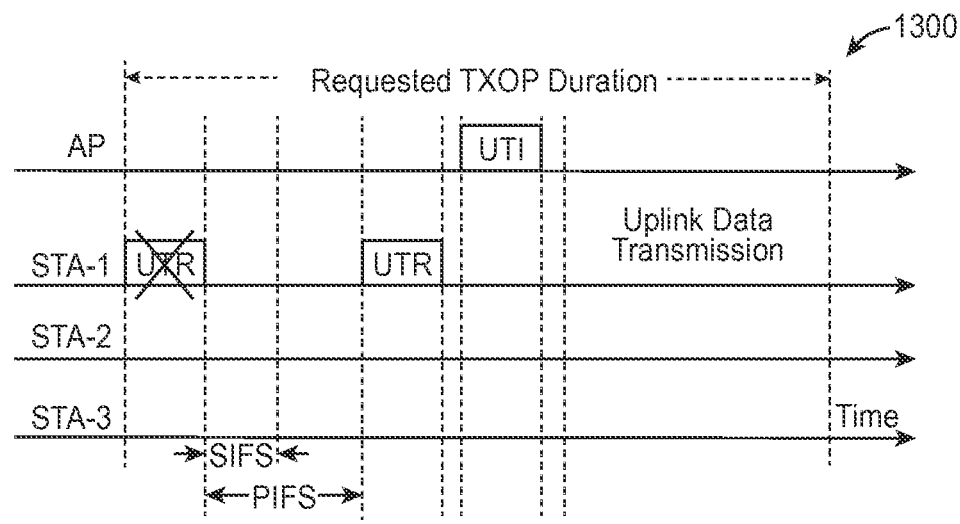
FIG. 13 shows a second approach for error recovery and backoff for loss of a UTR frame showing PIFS recovery when loss of an initial UTR frame, according to an embodiment.

FIG. 13 shows a second approach 1300 for error recovery and backoff for loss of a UTR frame showing PIFS recovery when loss of an initial UTR frame, according to an embodiment. In one example embodiment, it is also possible that the loss of the UTR frame was due to temporary transmission error. Therefore, the lost UTR frame may be resent before terminating the TXOP. In one embodiment, the TXOP owner STA may transmit the UTR frame again PIFS after the end of the first UTR frame (PIFS Recovery). In one embodiment, the approach 1300 shows the frame exchange sequence and timing of PIFS recovery when the initial UTR frame was lost. In one embodiment, the second UTR is successfully received by the AP and the UTI is sent.

In one embodiment, when a UTR frame is received at the AP, the AP responds with a UTI frame. If the AP does not detect any UL transmission SIFS after the end of its UTI frame, it shall consider the UTI frame is lost according to one embodiment. Since the UTI may be treated as the immediate response to the UTR frame, losing the UTI frame should be considered as the failure of the initial frame transmission. Therefore, in one embodiment the TXOP owner STA shall invoke exponential backoff (double the CW size and randomly pick a backoff timer value within the incremented CW).

Figure 14:
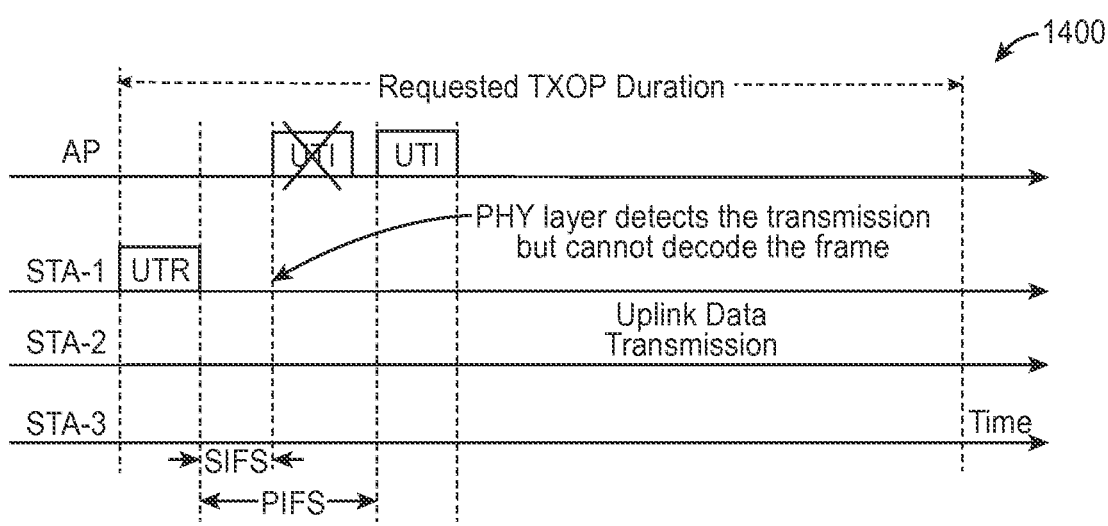
FIG. 14 shows an approach for error recovery and backoff for loss of a UTI frame showing PIFS recovery, according to an embodiment.

FIG. 14 shows an approach 1400 for error recovery and backoff for loss of a UTI frame showing PIFS recovery, according to an embodiment. In one embodiment, if the TXOP owner STA's PHY layer detects frame transmission in the air SIFS after the end of the UTR frame but cannot correctly decode the frame, the PHY layer may determine to wait for a duration PIFS after it sent out the UTR frame in order to receive the second UTI frame sent by the AP. In one embodiment, the AP may try to retransmit the UTI frame PIFS after the end of the UTI frame (i.e., PIFS Recovery). In one embodiment, if the second UTI is received, the transmission error is considered recovered, and the polled STAs shall start their uplink transmissions. Approach 1400 shows the PIFS recovery frame exchange sequence when the original UTI frame is lost.

In one embodiment, if the TXOP owner STA's PHY layer cannot detect any frame transmission in the air SIFS after the end of the UTR frame, it is most likely the UTR frame has been lost so the AP didn't send out the UTI frame. In one embodiment, the approaches for lost UTR frames are followed. In one embodiment, if the TXOP owner STA fails to get the UTI frame PIFS after the end of the UTR frame, it shall send out a CF-End to release the ownership of the TXOP and invoke exponential backoff (double the CW size and randomly pick a backoff timer value within the incremented CW). In one embodiment, it is possible that other STAs receive the UTI frame error-free but the TXOP owner STA does not. In this case, other STAs that have been polled will transmit while the TXOP owner will not (i.e., it is still waiting for the retransmitted UTI at PIFS). In this case, the TXOP owner may or may not receive the frames transmitted by other STAs, depending on whether they are within each other's transmission/receiving range.

Figure 15:
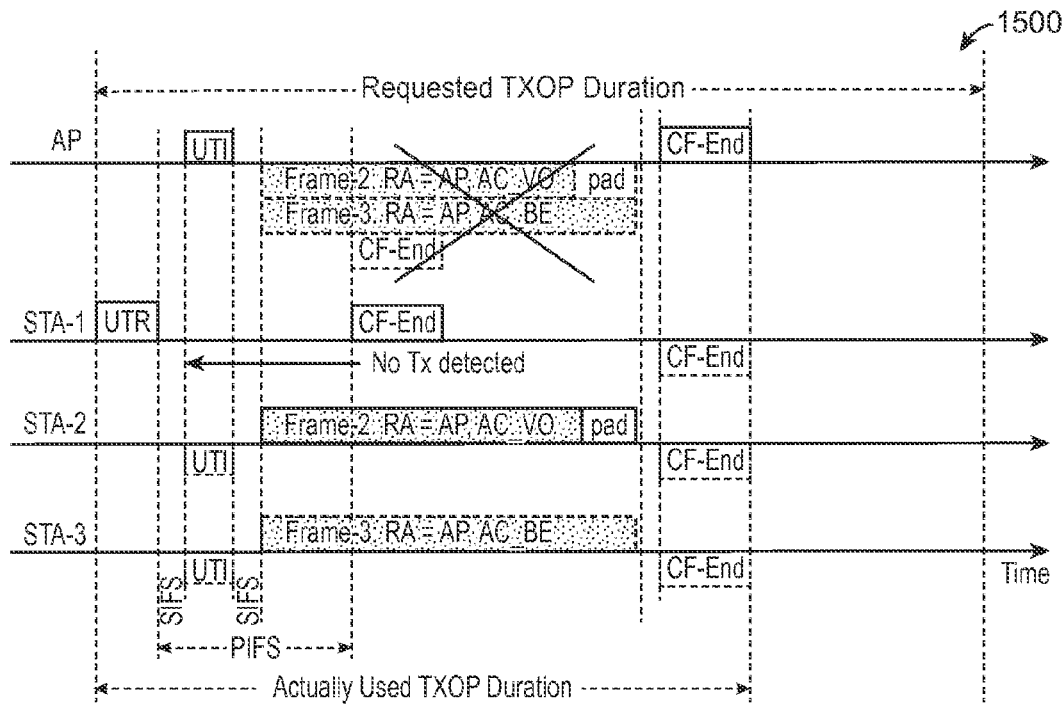
FIG. 15 shows an example of a TXOP owner's CF-End frame that collides with other STAs' uplink data frames, according to an embodiment.

FIG. 15 shows an example 1500 of a TXOP owner's CF-End frame that collides with other STAs' uplink data frames, according to an embodiment. In one embodiment, if the TXOP owner STA does not detect any frames transmitted by other STAs at SIFS after the end of the UTR frame, it will wait for the retransmitted UTI at PIFS after the end of the UTR frame, and the TXOP owner STA will not receive the retransmitted UTI because the AP is receiving UL transmissions from other STAs. Therefore, in one embodiment after PIFS, the TXOP owner STA shall transmit a CF-End frame to end the TXOP. However, this CF-End frame will collide with other STAs' data frames at the AP. In this case, in one embodiment all data/UTI frames will become useless and the transmission should be stopped. In one example embodiment, an option for ending the TXOP is to allow the AP to send out the CF-End (instead of the expecting ACKs) to terminate the current TXOP after the current UL transmission, even though the AP is not the owner of this TXOP (but it better informed). Note in example 1500 the frames with solid lines are sent frames while frames with dashed lines are received frames.

Figure 16:
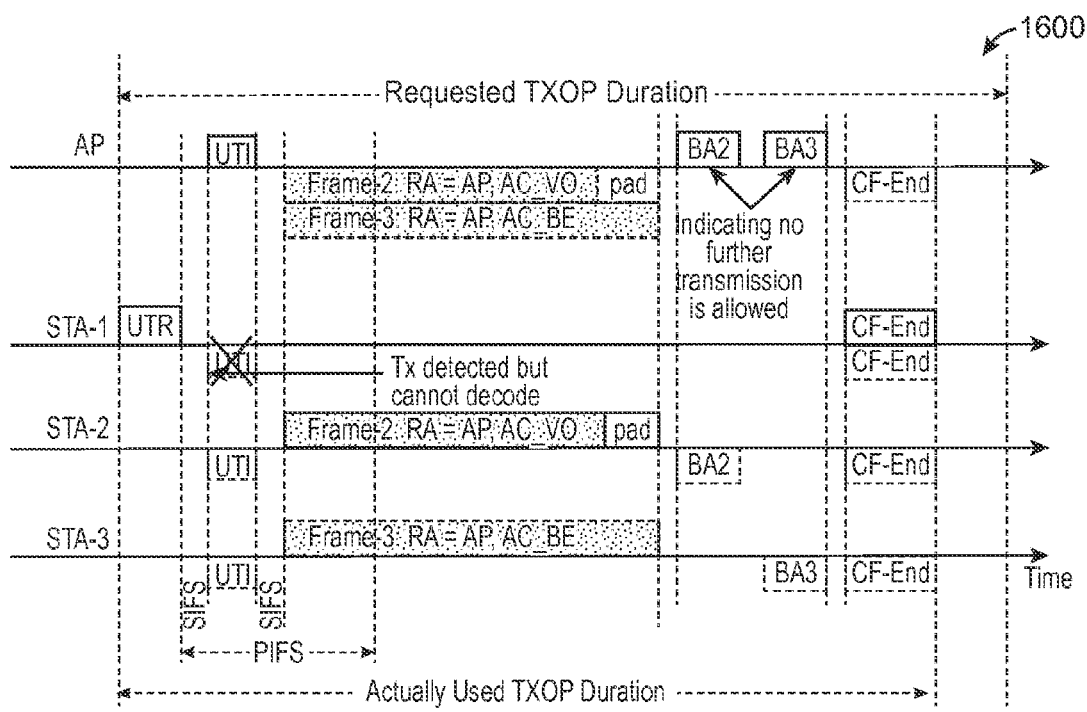
FIG. 16 shows an example of a TXOP owner not detecting frame transmission from other STAs, according to an embodiment.

FIG. 16 shows an example 1600 of a TXOP owner not detecting frame transmission from other STAs, according to an embodiment. In one embodiment, if the TXOP owner STA does detect some frame transmissions by other STAs at SIFS after the end of the UTR frame (but not the UTI frame), the TXOP owner STA realizes that it has missed the UTI frame but other STAs have received it correctly. In one embodiment, the TXOP owner STA shall wait for the UL transmissions from other STAs to complete, and the AP sends out the ACK frames. In one embodiment, if the AP receives UL frames from STAs other than the TXOP owner STA, it shall acknowledge these received frames so that they may be cleared from the STAs' buffers. However, in one embodiment, the AP shall not allow further transmissions from non-TXOP-owner STAs (e.g., setting the Duration field to zero in the ACK frames). In one embodiment, the TXOP owner STA will never get the UTI frame so it considers the initial frame exchange failed and sends out a CF-End frame to end the TXOP, SIFS after it receives ACK frames for other STAs as illustrated by example 1600.

Figure 17:
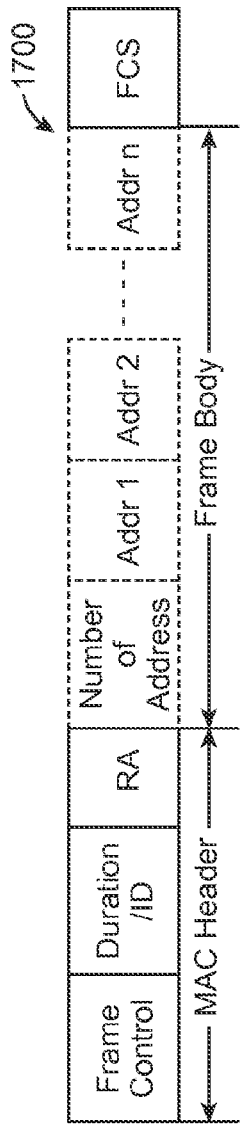
FIG. 17 shows a format of a CF-Multi-Poll frame, according to an embodiment.

FIG. 17 shows a format 1700 of a CF-Multi-Poll frame, according to an embodiment. In one embodiment, the CF-Multi-Poll frame may be used as either the UTI frame, or the non-initial polling frame for uplink transmissions. In one embodiment, if the CF-Multi-Poll frame is used as the initial UTI frame, its error handling process proceeds the same as losing the UTI frame.

Figure 18:
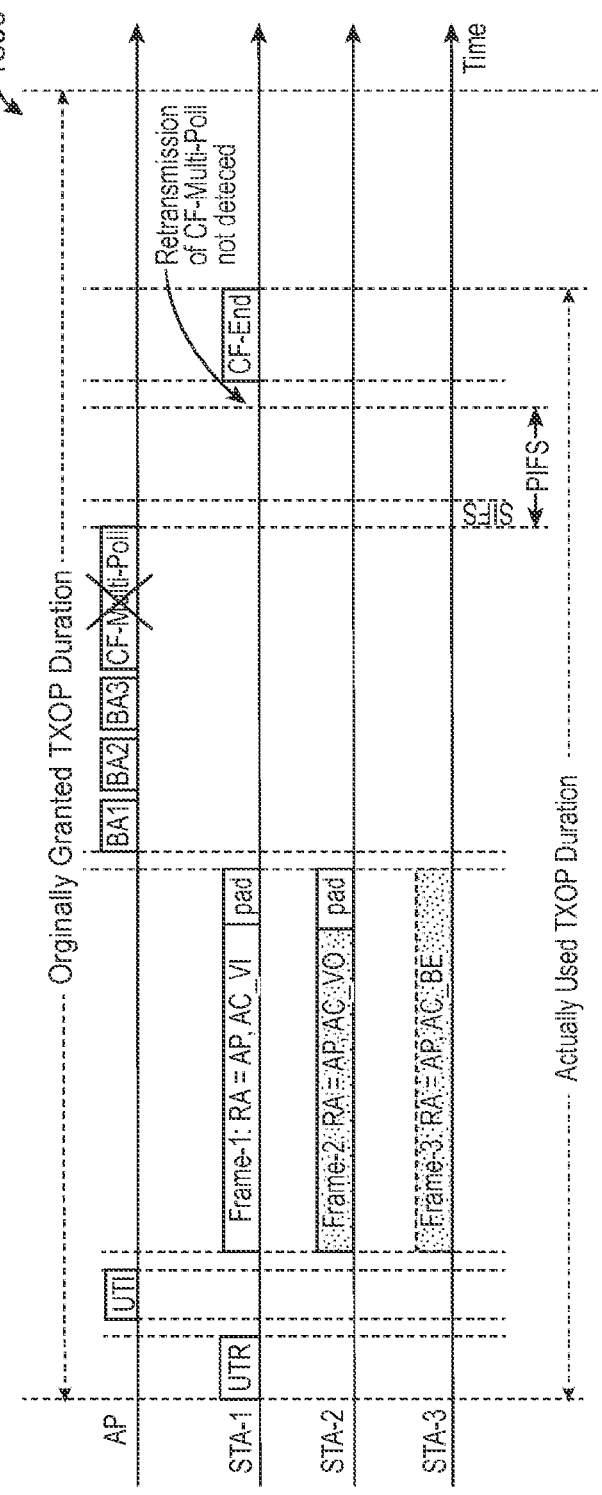
FIG. 18 shows an example of loss of a CF-Multi-Poll frame, according to an embodiment.

FIG. 18 shows an example 1800 of loss of a CF-Multi-Poll frame, according to an embodiment. In one embodiment, it is assumed that at least the ACK for the TXOP owner STA's previous data frame was successfully received. In one embodiment, when a CF-Multi-Poll frame does not contain the Ack function, it is transmitted after all the ACK frames. In one embodiment, if the TXOP owner STA does not receive a CF-Multi-Poll frame for its non-initial uplink transmission SIFS after the end of the last acknowledgement frame, it shall wait for the AP to transmit the CF-Multi-Poll frame again PIFS after the last acknowledgement frame. In one embodiment, if the duration has passed and the CF-Multi-Poll frame is still not received, it indicates the AP has serious difficulty sending the CF-Multi-Poll frame to the TXOP owner STA hence the TXOP owner STA shall send a CF-End frame to the network to terminate the TXOP as shown in example 1800.

Figure 19:
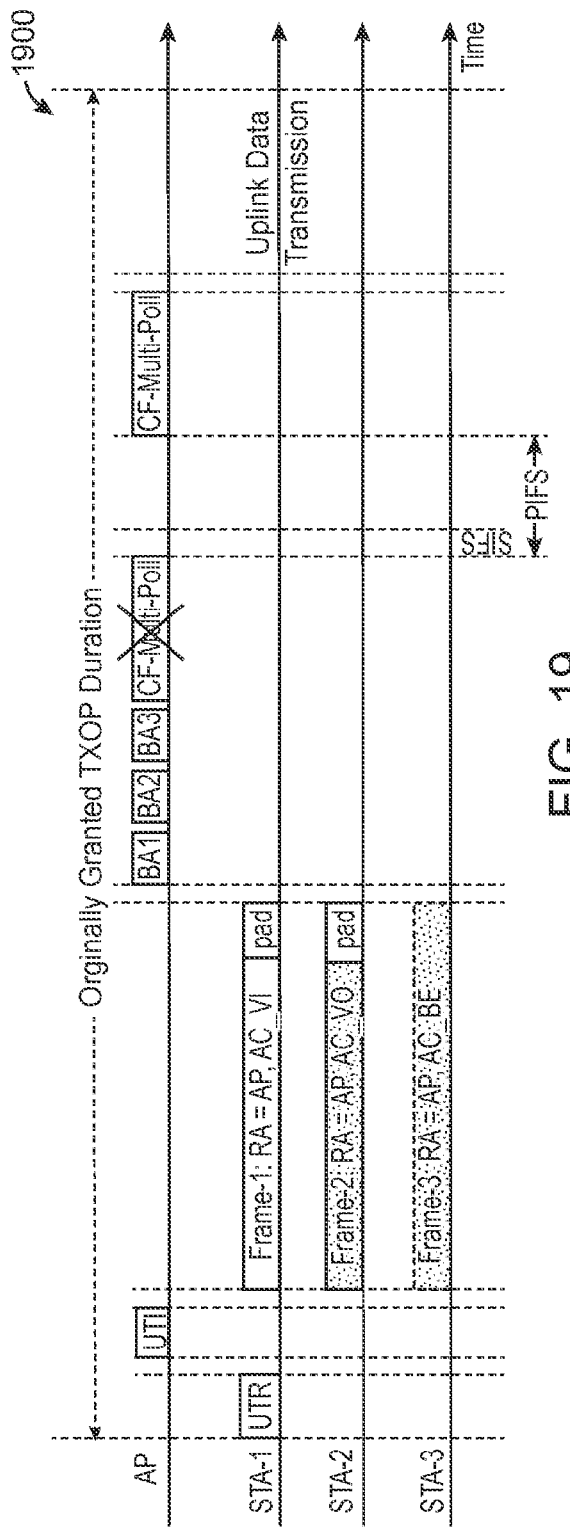
FIG. 19 shows an example of recovery of a loss of a CF-Multi-Poll frame, according to an embodiment.

FIG. 19 shows an example 1900 of recovery of a loss of a CF-Multi-Poll frame, according to an embodiment. In one embodiment, if a CF-Multi-Poll frame is received by the TXOP owner STA after the duration of SIFS after the end of the last acknowledgement frame, then the retransmission of the CF-Multi-Poll frame was successful and the transmission process was recovered as shown by example 1900.

Figure 20:
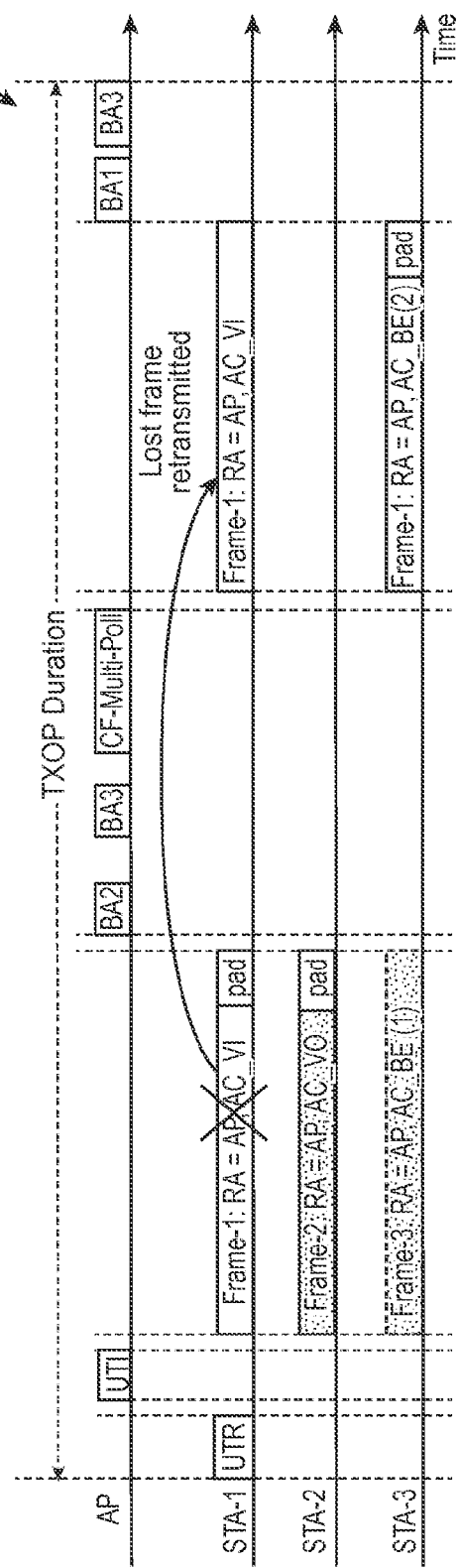
FIG. 20 shows an example of retransmission of a lost data frame, according to an embodiment.

FIG. 20 shows an example 2000 of retransmission of a lost data frame, according to an embodiment. In one embodiment, in a UL MU-MIMO TXOP, data transmissions always happen after the initial frame exchange, e.g., UTR and UTI. Therefore, in one embodiment when data frames are transmitted, protection has been established until the end of the TXOP. As a result of this embodiment, STAs may always try to retransmit the lost frames if the limits have not reached.

In one embodiment, after sending out a QoS data frame on the UL through MU-MIMO transmission, a STA expects a downlink acknowledgement from the AP, SIFS after the end of its data frame. If the acknowledgement of any kind is not received after SIFS, the data frame or the Ack frame itself is considered lost. In one embodiment, when the sequential acknowledgement approach is used, and if a STA receives a BA but the BA is not for itself, the STA shall not consider this a failure. In one embodiment, the STA shall check all the downlink BAs and only if its data frame was not acknowledged by any of the BAs frames, it shall consider its data frame has been lost.

In one embodiment, if an AP has polled a STA for UL transmission but the data frame was not successfully received, the AP shall poll that STA again in the next uplink transmission phase, up to the predetermined maximum retry limit.

Figure 21:
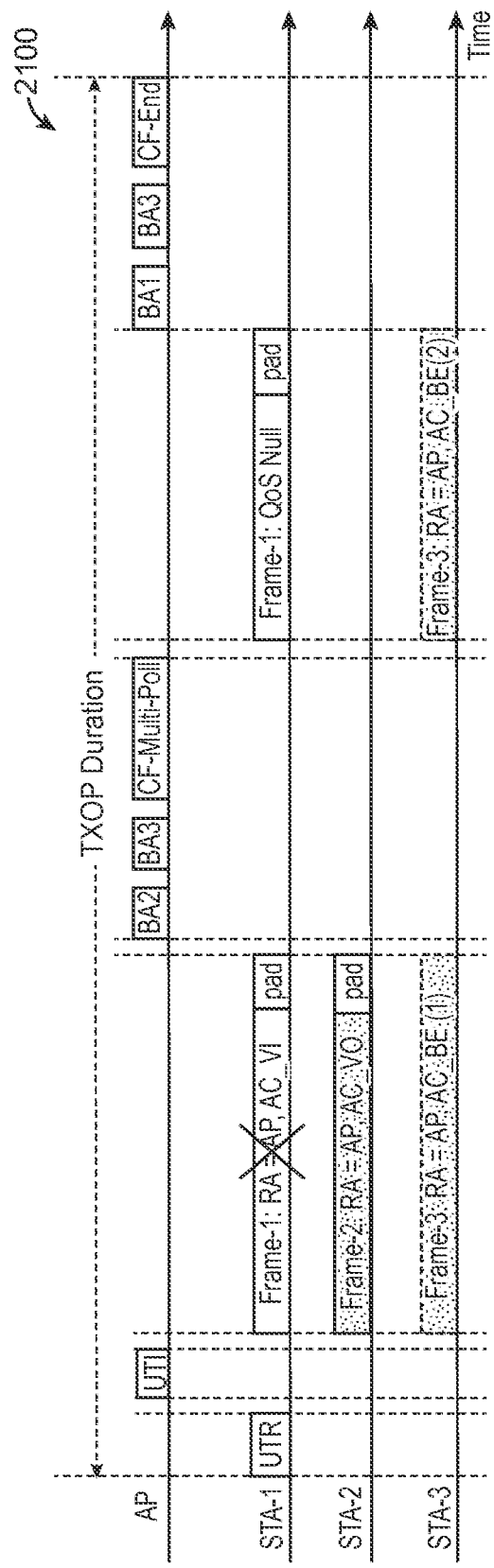
FIG. 21 shows an example of terminating a TXOP for loss of a data frame at the TXOP owner STA, according to an embodiment.

FIG. 21 shows an example 2100 of terminating a TXOP for loss of a data frame at the TXOP owner STA, according to an embodiment. In one embodiment, when being polled for the next UL data transmission, if a STA is the TXOP owner and it failed in receiving an ACK for its previously transmitted data frame, the TXOP owner STA shall either retransmit the previous failed frame (FIG. 20, example 2000) or send a QoS Null frame to indicate that it intends to end the TXOP (example 2100). In one embodiment, for example 2100 the AP will send out a CF-End frame to terminate the TXOP and the STA shall invoke exponential backoff (double the CW and randomly choose a timer value within the CW).

In one embodiment, when being polled for the next UL data transmission, if a STA is not the TXOP owner and it failed in receiving an ACK for its previously transmitted data frame, it may retransmit the previous failed frame or send a QoS Null frame to indicate that it does not intend to transmit again in this TXOP. In the latter case, the STA may or may not invoke exponential backoff (double the CW and randomly choose a timer value within the CW). In one embodiment, if a STA finds its previously transmitted data frame has been lost but it is not in the AP's polling list for the next UL transmission, it shall not retransmit the previous failed frame.

Figure 22:
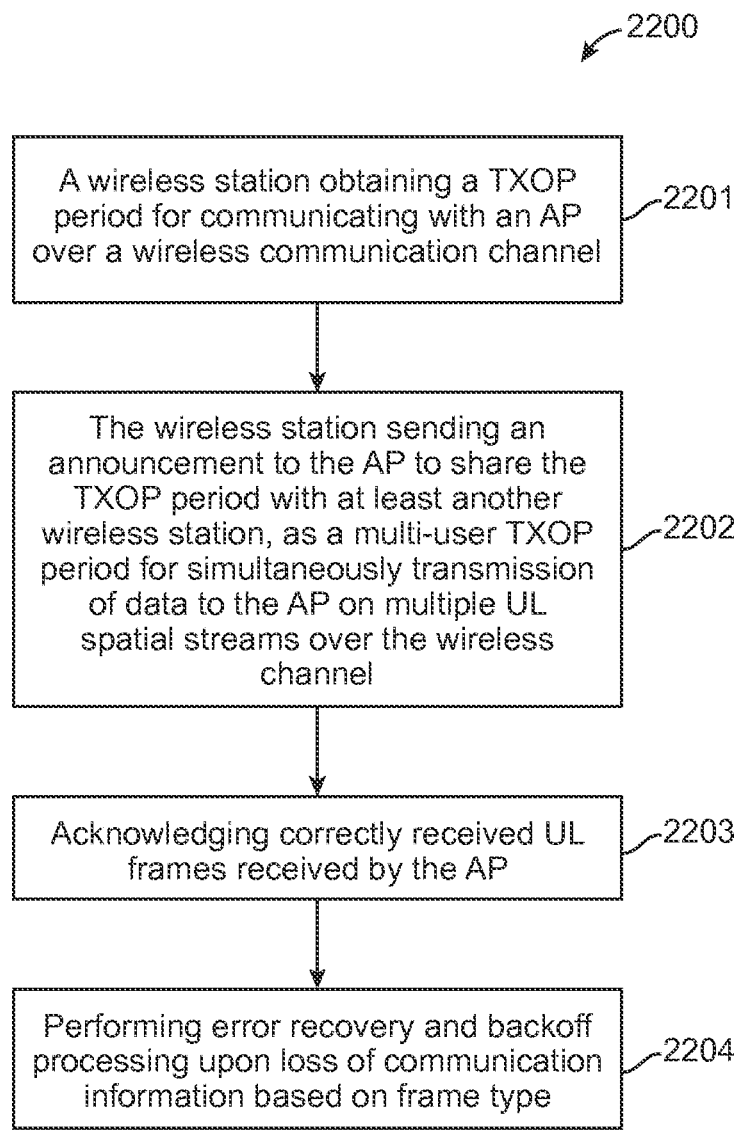
FIG. 22 shows a flow diagram for acknowledgement of correctly received UL data frames by the AP and error recovery and backoff processing, according to an embodiment.

FIG. 22 shows a flow diagram 2200 for communicating UL TXOP transmission information, according to an embodiment. In one embodiment, in block 2201 a wireless station obtains a TXOP period for communicating with an AP over a wireless communication channel. In one embodiment, in block 2202 the wireless station sends an announcement to the AP to share the TXOP period with at least another wireless station, as a multi-user TXOP period for simultaneously transmitting data from said wireless stations to the AP on multiple UL spatial streams over the wireless channel. In one embodiment, in block 2203 an AP acknowledges correctly received UL frames that it received. In one embodiment, in block 2204 error recovery and backoff processing are performed upon loss of communication.

In one embodiment, acknowledging correctly received UL frames received by the AP in block 2203 comprises the AP sending acknowledgement (ACK) or block acknowledgement (BA) frames to each of the wireless stations one by one sequentially based on UL transmission polling order. In one embodiment, acknowledging correctly received UL frames received by the AP in block 2203 comprises the AP sending acknowledgement (ACK) or block acknowledgement (BA) frames to each of the wireless stations in a DL signal, or a contention-free (CF)-Multi-Poll frame is used to acknowledge previously transmitted data frames and to poll for a next UL transmission.

In one embodiment, process 2200 includes UL data transmission in a wireless network that comprises a WLAN, wherein the data frames are organized into access categories in the order of transmission priority, contending for channel access by performing EDCA to provide QoS for a data frame in a high priority access category. In one embodiment, the AP performs downlink transmission of an acknowledgment to each wireless station in response to one or more uplink data frames. In one embodiment, the transmitting said announcement comprises transmitting a UTR, wherein the uplink data transmission comprises UL MU-MIMO communication from target wireless stations to the AP.

In one embodiment, a BA information length sub-field is used in a CF-Multi-Poll frame for determining length in octets of a following BA information subfield by a receiving wireless station to parse received frames.

In one embodiment, block 2204 comprises upon determining that a UTR frame is lost, recognizing transmission failure at a TXOP owner station, performing a backoff process for an AC, incrementing a CW, and selecting a random timer value within the CW. In one embodiment, block 2204 further comprises upon determining that a first UTR frame is lost, a TXOP owner wireless station transmits a second UTR frame after a PIFS from an end of the first UTR frame. In one embodiment, upon determining that a UTI frame is lost, recognizing transmission failure at a TXOP owner station, performing an exponential backoff process including doubling a size of a CW, and selecting a random timer value within the doubled CW.

In one embodiment, in process 2200 a TXOP owner station PHY layer detects frame transmission in a SIFS after an end of a UTR frame but cannot correctly decode the UTR frame, waiting a PIFS after the UTR frame was sent to receive a second UTI frame sent by the AP. In one embodiment, block 2204 further includes if a CF-Multi-Poll frame is used as the non-initial polling frame for UL transmissions, without an acknowledgement (ACK) function, transmitting the CF-Multi-Poll frame after all ACK frames, and if a TXOP owner wireless station does not receive a CF-Multi-Poll frame for a non-initial UL transmission SIFS after an end of a last ACK frame, waiting for the AP to transmit the CF-Multi-Poll frame again a PIFS after the last ACK frame.

In one embodiment, process 2200 includes determining that a data frame or ACK frame is lost, and after polling for a next UL data transmission, if a particular wireless station comprises the TXOP owner and failed in receiving an ACK frame for a previously transmitted data frame, the particular wireless station retransmits the previously transmitted frame or sends a QoS Null frame to indicate intent to end the TXOP by sending out a CF-End frame by the AP to terminate the TXOP and invoking exponential backoff based doubling a size of a CW and selects a random timer value within the doubled CW. In one embodiment, after polling for the next UL data transmission, if the particular wireless station is not the TXOP owner and failed in receiving the ACK for the previously transmitted data frame, the particular wireless station retransmits the previously transmitted frame or sends the QoS Null frame to indicate no intent to transmit again in the TXOP and one of not invoking exponential backoff or invoking exponential backoff based on doubling the size of the CW and selecting the random timer value within the doubled CW.

As is known to those skilled in the art, the aforementioned example architectures described above, according to one or more embodiments, may be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters, receivers, transceivers in wireless networks, etc. Further, one or more embodiments may take the form of an entirely hardware embodiment, an entirely software embodiment or an embodiment containing both hardware and software elements.

Figure 23:
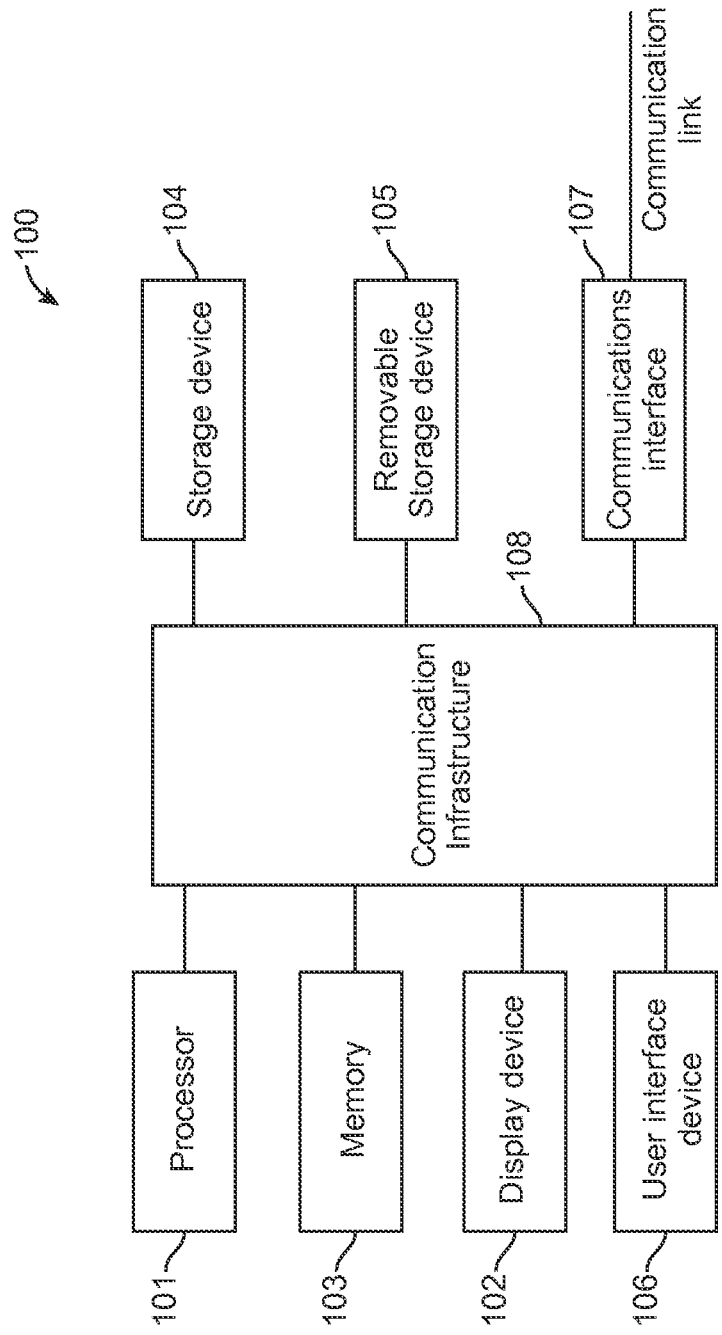
FIG. 23 is an exemplary high-level block diagram showing an information processing system comprising a computer system useful for implementing disclosed embodiments.

FIG. 23 is a high-level block diagram showing an information processing system comprising a computer system 100 useful for implementing the disclosed embodiments. The computer system 100 includes one or more processors 101, and can further include an electronic display device 102 (for displaying graphics, text, and other data), a main memory 103 (e.g., random access memory (RAM)), storage device 104 (e.g., hard disk drive), removable storage device 105 (e.g., removable storage drive, removable memory module, a magnetic tape drive, optical disk drive, computer readable medium having stored therein computer software and/or data), user interface device 106 (e.g., keyboard, touch screen, keypad, pointing device), and a communication interface 107 (e.g., modem, a network interface (such as an Ethernet card), a communications port, or a PCMCIA slot and card). The communication interface 107 allows software and data to be transferred between the computer system and external devices. The system 100 further includes a communications infrastructure 108 (e.g., a communications bus, cross-over bar, or network) to which the aforementioned devices/modules 101 through 107 are connected.

Information transferred via communications interface 107 may be in the form of signals such as electronic, electromagnetic, optical, or other signals capable of being received by communications interface 107, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

One or more embodiments provide acknowledging received data frames at the AP, recovering from transmission errors, and the backoff procedures when collisions are detected. One or more embodiments provide multiple procedures for acknowledging uplink MU-MIMO data frames including: the sequential method, the DL MU-MIMO method, and the Piggyback method (using a single CF-Multi-Poll+ACK frame). One or more embodiments provide error recovery and backoff procedures when losing the UTR frame, losing the UTI frame, losing the CF-Multi-Poll frame, and losing the data and acknowledgement frame.

One or more embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor creates means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer readable medium may comprise computer readable information in a transitory state medium such as a network link and/or a network interface, including a wired network or a wireless network, that allow a computer to read such computer readable information. Computer programs (i.e., computer control logic) are stored in main memory and/or secondary memory. Computer programs may also be received via a communications interface. Such computer programs, when executed, enable the computer system to perform the features as discussed herein. In particular, the computer programs, when executed, enable the processor multi-core processor to perform the features of the computer system. Such computer programs represent controllers of the computer system.

Though the embodiments have been described with reference to certain versions thereof; however, other versions are possible. Therefore, the spirit and scope of the appended claims should not be limited to the description of the preferred versions contained herein.

What is claimed is:

1. A method of wireless communication, comprising:
   obtaining a transmission opportunity (TXOP) period for communicating with an access point (AP) over a wireless communication channel;
   sending an announcement to the AP to share the TXOP period among wireless stations, as a multi-user TXOP period for simultaneously transmitting data from the wireless stations to the AP on multiple uplink (UL) spatial streams over the wireless communication channel; and
   performing error recovery and backoff processing upon loss of communication information based on frame type, wherein the frame type comprises an uplink transmission request (UTR) frame or an uplink transmission indication (UTI) control frame, and backoff processing comprises increasing a contention window (CW) or transmitting an additional UTI or UTR frame.

2. The method of claim 1, further comprising:
   acknowledging correctly transmitted UL frames transmitted to the AP based on receiving acknowledgement (ACK) or block acknowledgement (BA) frames by each of the wireless stations one by one sequentially based on UL transmission polling order.

3. The method of claim 1, wherein acknowledging correctly transmitted UL frames comprises:
   receiving ACK or BA frames by each of the wireless stations in a single down link (DL) multi-user multiple-input-multiple-output (MU-MIMO) physical layer protocol data unit (PPDU).

4. The method of claim 2, wherein acknowledging correctly transmitted UL frames comprises:
   using a contention-free (CF)-Multi-Poll frame to acknowledge previously transmitted data frames and to poll for a next UL transmission.

5. The method of claim 4, further comprising:
   transmitting UL data in a wireless network comprising a wireless local area network (WLAN), wherein data frames are organized into access categories in order of transmission priority;
   contending for channel access by performing Enhanced Distributed Channel Access (EDCA) to provide quality of service (QoS) for a data frame in a high priority access category;
   receiving downlink transmission of an acknowledgment by each wireless station in response to one or more uplink data frames,
   wherein sending the announcement comprises transmitting a UTR frame, and the uplink data transmission comprises uplink multi-user multiple-input-multiple-output (UL MU-MIMO) communication transmitted from target wireless stations to the AP.

6. The method of claim 5, further comprising:
   using a BA information length sub-field in a CF-Multi-Poll frame for determining length in octets of a following BA information subfield by a receiving wireless station to parse received frames.

7. The method of claim 1, wherein performing error recovery and backoff processing upon loss of communication information for a UTR frame type comprises:
   upon determining that a UTR frame is lost, recognizing transmission failure at a TXOP owner station, performing a backoff process for an access category (AC), incrementing a contention window (CW), and selecting a random timer value within the CW.

8. The method of claim 1, wherein performing error recovery and backoff processing upon loss of communication information based on the UTR frame type comprises:
   upon determining that a first UTR frame is lost, a TXOP owner wireless station transmitting a second UTR frame after a point coordination function (PCF) interframe space (PIFS) from an end of the first UTR frame.

9. The method of claim 1, wherein performing error recovery and backoff processing upon loss of communication information based on a UTI frame type comprises:
   upon determining that a UTI frame is lost, recognizing transmission failure at a TXOP owner station, performing an exponential backoff process including doubling a size of a contention window (CW), and selecting a random timer value within the doubled CW.

10. The method of claim 1, wherein performing error recovery and backoff processing upon loss of communication information based on a UTI frame type comprises:
    upon determining that a first UTI frame is lost, a TXOP owner station's physical (PHY) layer detecting frame transmission in a short interframe space (SIFS) after an end of a UTR frame but cannot correctly decode the UTR frame, and waiting a point coordination function (PCF) interframe space (PIFS) after the UTR frame was sent to receive a second UTI frame.

11. The method of claim 1, wherein frame type further comprises a contention-free (CF)-Multi-Poll frame, and performing error recovery and backoff processing upon loss of communication information based on a CF-Multi-Poll frame type comprises:
    if a CF-Multi-Poll frame is used as the non-initial polling frame for UL transmissions, without an acknowledgement (ACK) function, transmitting the CF-Multi-Poll frame after all ACK frames; and
    if a TXOP owner wireless station does not receive a CF-Multi-Poll frame for a non-initial UL transmission short interframe space (SIFS) after an end of a last ACK frame, waiting for transmitting of the CF-Multi-Poll frame again a point coordination function (PCF) interframe space (PIFS) after the last ACK frame.

12. The method of claim 1, wherein the frame type further comprises a data frame or acknowledgement (ACK) frame, and performing error recovery and backoff processing upon loss of communication information based on a data or ACK frame type comprises:
    determining that a data frame or ACK frame is lost; and
    after polling for a next UL data transmission, if a particular wireless station comprises the TXOP owner and failed in receiving an ACK frame for a previously transmitted data frame, the particular wireless station performs retransmitting the previously transmitted frame or sending a QoS Null frame to indicate intent to end the TXOP by sending out a CF-End frame by the AP to terminate the TXOP or invoking exponential backoff based on doubling a size of a CW and selecting a random timer value within the doubled CW.

13. The method of claim 12, further comprising:
    after polling for the next UL data transmission, if the particular wireless station is not the TXOP owner and failed in receiving the ACK frame for the previously transmitted data frame, the particular wireless station retransmitting the previously transmitted data frame or sending the QoS Null frame to indicate no intent to transmit again in the TXOP and not invoking exponential backoff or invoking exponential backoff based on doubling the size of the CW and selecting a random timer value within the doubled CW.

14. A wireless station, comprising:
a Physical Layer (PHY) for wireless communication over a wireless communication channel;
a Media Access Control (MAC) layer; and
a channel access processor configured to obtain a transmission opportunity period (TXOP) to communicate with an access point (AP) over the wireless communication channel, wherein the channel access processor is configured to send an announcement to the AP to share the TXOP with at least another wireless station as a multi-user transmission opportunity period for simultaneously transmitting data from the wireless stations to the AP on multiple uplink (UL) spatial streams over the wireless communication channel, and to perform error recovery and backoff processing upon loss of communication information based on frame type, the frame type comprises an uplink transmission request (UTR) frame or an uplink transmission indication (UTI) control frame, and the backoff processing comprises the channel access processor configured to increase a contention window (CW) or to transmit an additional UTI or UTR frame.

15. The wireless station of claim 14, wherein correctly transmitted UL frames are acknowledged based on receiving acknowledgement (ACK) or block acknowledgement (BA) frames by each of the wireless stations one by one sequentially based on UL transmission polling order, or receiving the ACK or BA frames by each of the wireless stations in a down link (DL) multi-user multiple-input-multiple-output (MU-MIMO) physical layer protocol data unit (PPDU)(DL MU-MIMO PPDU).

16. The wireless station of claim 14, wherein correctly transmitted UL frames are based on using a contention-free (CF)-Multi-Poll frame to acknowledge previously transmitted data frames and to poll for a next UL transmission.

17. The wireless station of claim 14, wherein:
the channel access processor is configured to provide uplink data transmission in a wireless local area network (WLAN), the data frames are organized into access categories in order of transmission priority, contends for channel access by performing Enhanced Distributed Channel Access (EDCA) to provide quality of service (QoS) for a data frame in a high priority access category;
each wireless station is configured to receive a downlink (DL) acknowledgement based on one or more UL data frames;
the announcement comprises a UTR frame; and
the uplink data transmission comprises UL multi-user multiple-input-multiple-output (UL MU-MIMO) communication from target wireless stations to the AP.

18. The wireless station of claim 17, wherein the channel access processor is configured to use a BA information length sub-field in a contention-free (CF)-Multi-Poll frame to determine length in octets of a following BA information subfield by a receiving wireless station to parse received frames.

19. The wireless station of claim 14, wherein the channel access processor is configured to perform the error recovery and backoff processing upon loss of communication information based on a UTR frame type based on being further configured to:
determine that a first UTR frame is lost, and:
perform a backoff process for an access category (AC), increment a contention window (CW) and select a random timer value within the CW after recognizing transmission failure at a TXOP owner station; or
a TXOP owner wireless station to transmit a second UTR frame after a point coordination function (PCF) interframe space (PIFS) from an end of the first UTR frame.

20. The wireless station of claim 14, wherein the channel access processor is configured to perform the error recovery and backoff processing upon loss of communication information based on UTI frame type based on being further configured to:
upon determining that a first UTI frame is lost:
perform an exponential backoff process including doubling a size of a contention window (CW), and select a random timer value within the doubled CW after recognizing transmission failure at a TXOP owner station; or
a TXOP owner station PHY layer to detect frame transmission in a short interframe space (SIFS) after an end of a UTR frame but cannot correctly decode the UTR frame, wait a point coordination function (PCF) interframe space (PIFS) after the UTR frame was sent to receive a second UTI frame sent by the AP.

21. The wireless station of claim 19, wherein frame type further comprises a contention-free (CF)-Multi-Poll frame, and the channel access processor is configured to perform the error recovery and backoff processing upon loss of communication information based on a CF-Multi-Poll frame type by being further configured to:
upon using a CF-Multi-Poll frame as the non-initial polling frame for UL transmissions, without an acknowledgement (ACK) function, transmit the CF-Multi-Poll frame after all ACK frames; and
upon a TXOP owner wireless station not receiving a CF-Multi-Poll frame for a non-initial UL transmission short interframe space (SIFS) after an end of a last ACK frame, wait for the AP to transmit the CF-Multi-Poll frame again a point coordination function (PCF) interframe space (PIFS) after the last ACK frame.

22. The wireless station of claim 19, wherein the frame type further comprises a data frame or acknowledgement (ACK) frame, and the channel access processor is configured to perform error recovery and backoff processing upon loss of communication information based on a data or ACK frame type by being further configured to:
determine that a data frame or ACK frame is lost, after polling for a next UL data transmission, if a particular wireless station comprises the TXOP owner and failed to receive an ACK frame for a previously transmitted data frame; and
the particular wireless station is configured to:
retransmit the previously transmitted data frame; or
send a QoS Null frame to indicate intent to end the TXOP to terminate the TXOP by receiving a CF end of frame and invoking exponential backoff based on doubling a size of a contention window (CW) and select a random timer value within the doubled CW.

23. The wireless station of claim 22, wherein after polling for the next UL data transmission, if the particular wireless station is not the TXOP owner and failed to receive the ACK for the previously transmitted data frame, the particular wireless station is configured to:
retransmit the previously transmitted frame; or
send the QoS Null frame to indicate no intent to transmit again in the TXOP and not to invoke exponential backoff or to invoke exponential backoff based on doubling the size of the CW and selecting the random timer value within the doubled CW.

24. A wireless access point, comprising:
a Physical Layer (PHY) for wireless communication over a wireless communication channel; and
a Media Access Control (MAC) layer configured to manage simultaneous transmissions to the access point on multiple uplink (UL) spatial streams during a multi-user transmission opportunity period over the wireless communication channel,
wherein the wireless access point (AP) is configured to determine if UL frames are received correctly and to receive communications based on error recovery and backoff processing upon loss of communication information based on frame type, the frame type comprises an uplink transmission request (UTR) frame or an uplink transmission indication (UTI) control frame, and the backoff processing comprises the AP to increase a contention window (CW) or to transmit an additional UTI or UTR frame.

25. The wireless access point of claim 24, wherein the wireless AP determines if UL frames are received correctly based on being configured to:
transmit acknowledgement (ACK) or block acknowledgement (BA) frames one by one sequentially based on UL transmission polling order;
transmit the ACK or BA frames to each of the wireless stations in a downlink (DL) signal; or
use a contention-free (CF)-Multi-Poll frame to acknowledge previously transmitted data frames and to poll for a next UL transmission.

26. The wireless access point of claim 25, wherein:
the wireless AP comprises a channel access processor that is configured to provide UL data transmission in a wireless local area network (WLAN);
the data frames are organized into access categories in order of transmission priority, contends for channel access by performing Enhanced Distributed Channel Access (EDCA) to provide QoS for a data frame in a high priority access category;
the wireless AP is configured to perform DL transmission of an ACK in response to one or more UL data frames; and
the UL data transmission comprises UL multi-user multiple-input-multiple-output (UL MU-MIMO) communication to the AP.

27. The wireless access point of claim 26, wherein the channel access processor uses a BA information length subfield in a contention-free (CF)-Multi-Poll frame to determine length in octets of a following BA information subfield by a receiving wireless station to parse received frames.

28. The wireless access point of claim 24, wherein error recovery and backoff processing upon loss of communication information based on a UTR frame type comprises:
upon determining that a first UTR frame is lost:
after recognizing transmission failure at a TXOP owner station, the channel access processor is configured to perform a backoff process for an access category (AC), increments a CW, and select a random timer value within the CW; or
the wireless AP is configured to receive a second UTR frame after a point coordination function (PCF) interframe space (PIFS) from an end of the first UTR frame.

* * * * *